United States Patent
Yang et al.

(10) Patent No.: US 11,342,799 B2
(45) Date of Patent: May 24, 2022

(54) OUT-OF-BAND COMMUNICATION DURING WIRELESS BATTERY CHARGING

(71) Applicant: Huawei Digital Power Technologies Co., Ltd., Shenzhen (CN)

(72) Inventors: Songnan Yang, Frisco, TX (US); Xiaolin Mao, Cupertino, CA (US)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/687,288

(22) Filed: Nov. 18, 2019

(65) Prior Publication Data

US 2020/0161907 A1 May 21, 2020

Related U.S. Application Data

(63) Continuation of application No. PCT/CN2019/084649, filed on Apr. 26, 2019.

(Continued)

(51) Int. Cl.
*H02J 50/80* (2016.01)
*H02J 7/02* (2016.01)

(Continued)

(52) U.S. Cl.
CPC ............. *H02J 50/80* (2016.02); *H02J 7/025* (2013.01); *H02J 7/042* (2013.01); *H02J 50/10* (2016.02); *H02M 3/1582* (2013.01)

(58) Field of Classification Search
CPC .. H02J 50/80; H02J 7/025; H02J 7/042; H02J 50/10; H02J 50/12; H02J 5/005; H02M 3/1582

See application file for complete search history.

(56) References Cited

U.S. PATENT DOCUMENTS

| 9,973,039 B2 | 5/2018 | Morreale et al. |
| 2008/0180564 A1 | 7/2008 | Yamaji |

(Continued)

FOREIGN PATENT DOCUMENTS

| CN | 104380569 A | 2/2015 |
| CN | 104854797 A | 12/2017 |

(Continued)

OTHER PUBLICATIONS

International Search Report & The Written Opinion of the International Searching Authority dated Aug. 19, 2019, International Application No. PCT/CN2019/084649.

(Continued)

*Primary Examiner* — Stacy Whitmore
(74) *Attorney, Agent, or Firm* — Vierra Magen Marcus LLP

(57) ABSTRACT

Described herein is a wireless charging system including a wireless power transmitter and a wireless power receiver, where the wireless power receiver is part of a wireless electronic device such as a mobile telephone. The wireless power receiver is used to charge a battery of the wireless electronic device and can include both a closed-loop DC-DC converter, such as a buck charger, and an open-loop DC-DC converter, such as a switched capacitor charger. In addition to an in-band communication channel between the power transmitter and the power receiver, the system also includes an out-of-band communication channel through which the power transmitter and the power receiver can exchange control signals, helping to avoid interference that can occur in the in-band communication channel when using the open-loop DC-DC converter.

17 Claims, 13 Drawing Sheets

Related U.S. Application Data

(60) Provisional application No. 62/770,335, filed on Nov. 21, 2018.

(51) Int. Cl.
    *H02M 3/158*     (2006.01)
    *H02J 7/04*     (2006.01)
    *H02J 50/10*     (2016.01)

(56) References Cited

U.S. PATENT DOCUMENTS

| | | |
|---|---|---|
| 2012/0223674 A1 | 9/2012 | Choi et al. |
| 2012/0281547 A1 | 11/2012 | Kim et al. |
| 2014/0152251 A1 | 6/2014 | Kim et al. |
| 2014/0191712 A1 | 7/2014 | Rea et al. |
| 2015/0054351 A1 | 2/2015 | Deguchi et al. |
| 2016/0099604 A1* | 4/2016 | Von Novak, III ...... H02J 50/12 320/108 |
| 2016/0190813 A1* | 6/2016 | Kumar .................. H02J 7/0016 307/18 |
| 2017/0077734 A1* | 3/2017 | Nokkonen .......... H02J 7/00034 |
| 2017/0104373 A1* | 4/2017 | Bae ..................... H02J 7/00304 |
| 2017/0133889 A1 | 5/2017 | Yeo et al. |
| 2017/0207659 A1* | 7/2017 | Mofidi ................. H04B 5/0031 |
| 2017/0302097 A1* | 10/2017 | Kim ......................... H02J 7/025 |
| 2018/0013303 A1 | 1/2018 | Wu et al. |
| 2018/0041253 A1* | 2/2018 | Moonen .................. H02J 50/12 |
| 2018/0115157 A1 | 4/2018 | Chan et al. |
| 2018/0131413 A1* | 5/2018 | Won ......................... H02J 50/90 |
| 2019/0006891 A1* | 1/2019 | Park .................... H02J 7/00034 |
| 2019/0238000 A1* | 8/2019 | Salvekar ................ H02J 7/025 |
| 2019/0280535 A1* | 9/2019 | Tu ........................... H02J 50/10 |
| 2019/0312459 A1* | 10/2019 | Garbus .............. H02J 7/00034 |
| 2019/0312469 A1* | 10/2019 | Shichino ................ H02J 7/025 |
| 2020/0076222 A1* | 3/2020 | Yang ........................ H02J 50/12 |
| 2020/0091780 A1* | 3/2020 | Lee ......................... H02J 7/025 |
| 2020/0099257 A1* | 3/2020 | Qiu ..................... H02J 7/00712 |
| 2020/0119591 A1* | 4/2020 | Arnitz ..................... H02J 50/20 |
| 2020/0136421 A1* | 4/2020 | Kim ......................... H02J 50/80 |
| 2021/0057934 A1* | 2/2021 | Zhao ........................ H02M 1/08 |

FOREIGN PATENT DOCUMENTS

| | | | |
|---|---|---|---|
| CN | 107681709 A | 2/2018 | |
| CN | 105144544 A | 3/2018 | |
| CN | 107979152 A | 5/2018 | |
| CN | 207339384 U | 5/2018 | |
| CN | 108183559 A | 6/2018 | |
| CN | 207625303 U | 7/2018 | |
| CN | 108429364 A | 8/2018 | |
| EP | 3334006 A1 | 6/2018 | |
| WO | 2009112900 A1 | 9/2009 | |
| WO | 2013151831 A1 | 10/2013 | |
| WO | 2014171774 A1 | 10/2014 | |
| WO | 2016209578 A1 | 12/2016 | |
| WO | WO-2017188628 A1 * | 11/2017 | ............... H01Q 1/24 |
| WO | WO-2018004116 A1 * | 1/2018 | ............... H02J 7/02 |
| WO | WO-2018066847 A1 * | 4/2018 | ............. H02J 7/025 |

OTHER PUBLICATIONS

Wireless Power Consortium, "The Qi Wireless Power Transfer System," Power Class 0 Specification, Parts 1 and 2: Interface Definitions, Version 1.2.2, Apr. 2016, 160 pages.

CN Office Action dated Sep. 28, 2020, CN Application No. 201910346526.8.

Chinese Office Action dated Jun. 5, 2020, Chinese Patent Application No. 201910346526.8.

Examination Report dated Sep. 24, 2021, Indian Patent Application No. 202137027638.

Extended European Search Report dated Dec. 17, 2021, European Patent Application No. 19886465.4-1216.

\* cited by examiner

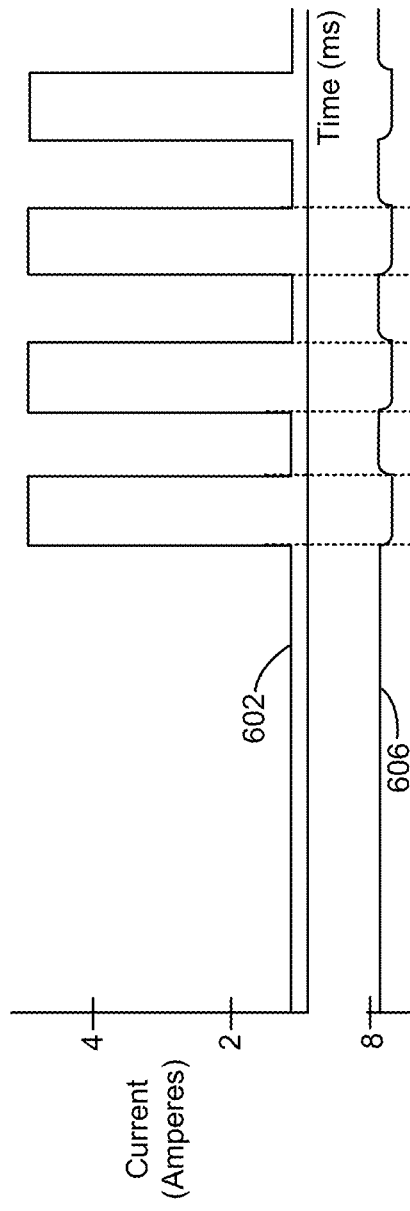
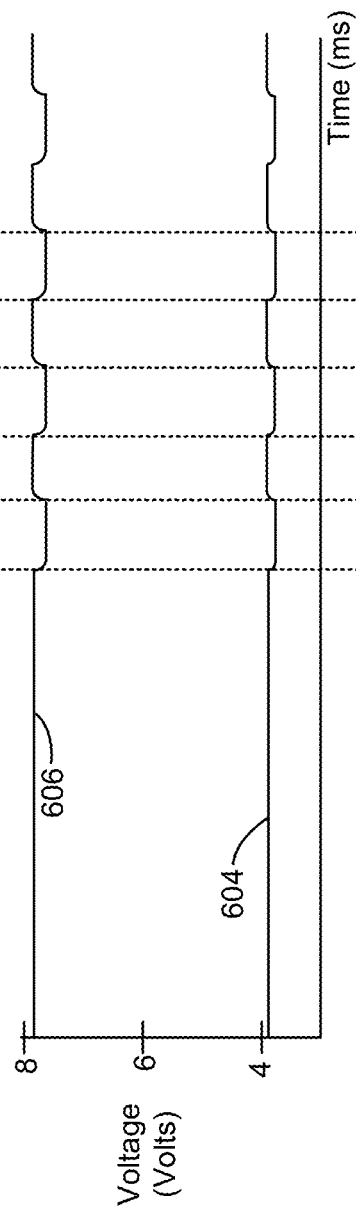
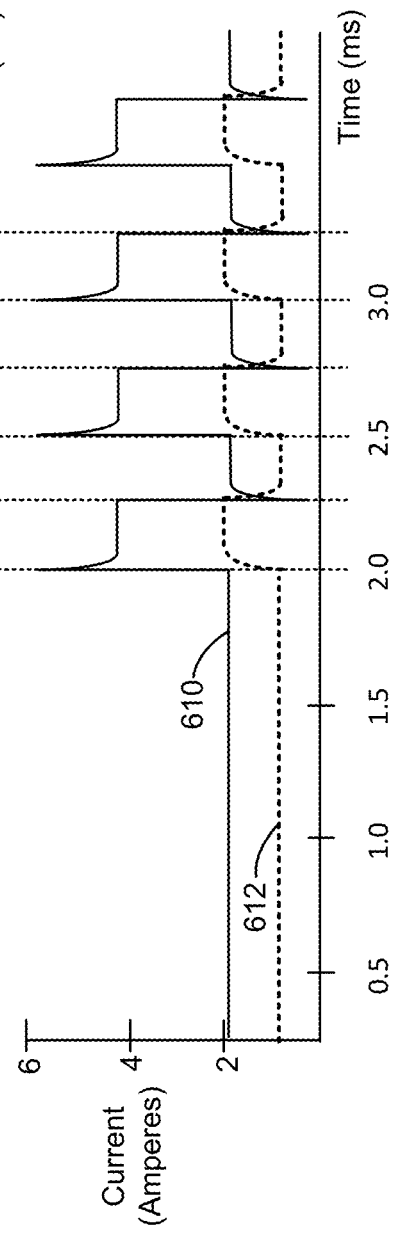

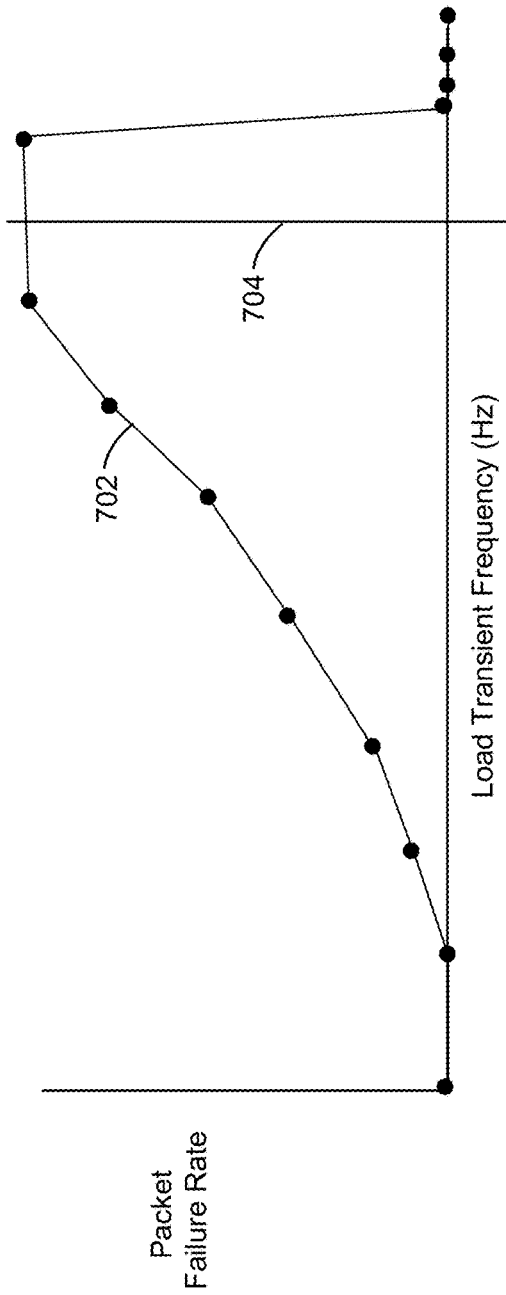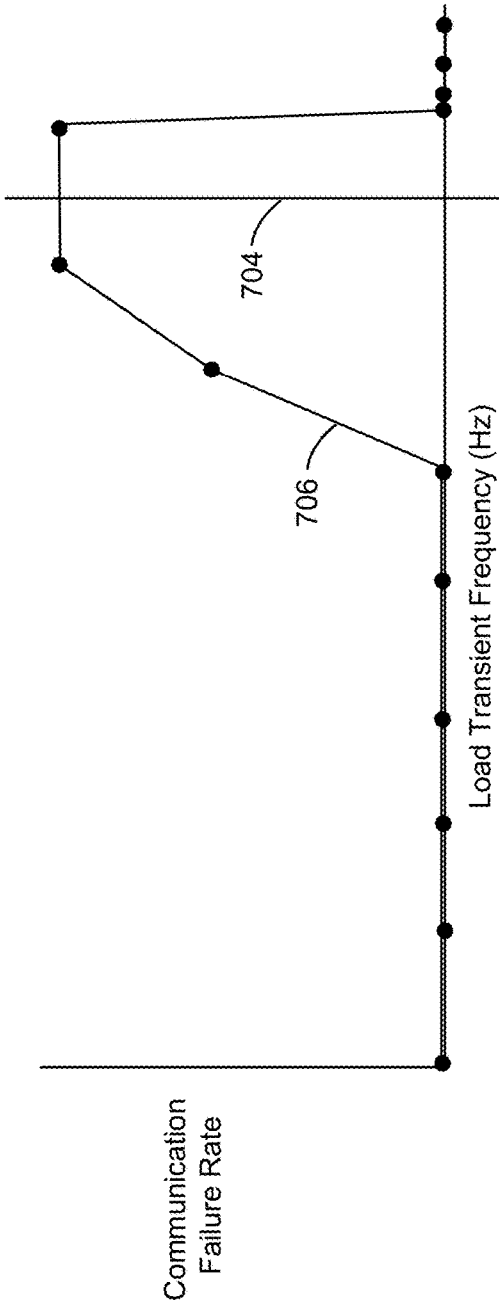

OUT-OF-BAND COMMUNICATION DURING WIRELESS BATTERY CHARGING

CLAIM OF PRIORITY

This application is a continuation of PCT Patent Application No. PCT/CN2019/084649, entitled, "OUT-OF-BAND COMMUNICATION DURING WIRELESS BATTERY CHARGING," filed Apr. 26, 2019 by Yang et al., which claims priority to U.S. Provisional Patent Application No. 62/770,335, entitled, "OUT-OF-BAND COMMUNICATION DURING WIRELESS BATTERY CHARGING," filed Nov. 21, 2018 by Yang et al., both of which are incorporated by reference herein in their entirety.

This application claims priority to U.S. Provisional Patent Application No. 62/770,335, entitled, "OUT-OF-BAND COMMUNICATION DURING WIRELESS BATTERY CHARGING," filed Nov. 21, 2018 by Yang et al., which is incorporated by reference in its entirety.

TECHNICAL FIELD

The disclosure generally relates to wireless battery charging systems and methods for use therewith.

BACKGROUND

In a typical Qi-standard wireless battery charging system, an adapter converts power from an AC voltage to a DC voltage and supplies the DC voltage to a wireless power transmitter (TX). The wireless power TX transmits power wirelessly via an inductive coupling to a wireless power receiver (RX), which rectifies the power and supplies a DC voltage to a charger. The charger charges a rechargeable battery with a regulated current or voltage.

Communications are used to control the system's operation. In the Qi-standard, which was developed by the Wireless Power Consortium (WPC), communication from the wireless power RX to the wireless power TX is accomplished by modulating a load seen by a coil of the wireless power RX, and communication from the wireless power TX to the wireless power RX is accomplished by modulating the frequency of the transmitted power signal. Both of the aforementioned types of communications are in-band communications. The communication between the wireless power TX and the adapter can be, for example, through wires in a universal serial bus (USB) cable.

SUMMARY

According to a first aspect of the present disclosure, an apparatus is provided for charging a battery using wirelessly received power. The apparatus includes a wireless power receiver circuit, one or more charging circuits, an antenna, and a controller. The wireless power receiver circuit includes a receiver coil, and the wireless power receiver circuit is configured to use the receiver coil to receive power wirelessly from a wireless power transmitter and generate therefrom a direct current (DC) output voltage. The one or more charging circuit include a first charging circuit, each including a voltage input terminal and a charging output terminal, the voltage input terminal of each of the one or more charging circuits configured to accept the DC output voltage from the wireless power receiver circuit, and the charging output terminal of each of the one or more charging circuits configured to be coupled to a terminal of a battery to provide a corresponding charging current thereto. The antenna is configured to receive and to transmit out-of-band control signals. The controller is configured to communicate with the wireless power transmitter by in-band control signals exchanged through the receiver coil of the wireless power receiver circuit and by the out-of-band control signals exchanged through the antenna, the controller further configured to control the charging by the first charging circuit of a battery coupled to the first charging circuit according to the out-of-band control signals.

Optionally, in a second aspect and in furtherance of the first aspect, the one or more charging circuits include a closed-loop DC-DC converter and an open-loop DC-DC converter, the first charging circuit being the open-loop DC-DC converter.

Optionally, in a third aspect and in furtherance of the second aspect, the open-loop DC-DC converter is a switched capacitor charger.

Optionally, in a fourth aspect and in furtherance of any of the second or third aspects, the closed-loop DC-DC converter is a buck charger.

Optionally, in a fifth aspect and in furtherance of any of the second to fourth aspects, the controller is further configured to control the charging by the closed-loop DC-DC converter of a battery coupled to the closed-loop DC-DC converter according to the in-band control signals.

Optionally, in a sixth aspect and in furtherance of any of the second to fifth aspects, the controller is further configured to control the charging by the closed-loop DC-DC converter of a battery coupled to the closed-loop DC-DC converter according to the out-of-band control signals.

Optionally, in a seventh aspect and in furtherance of any of the first to sixth aspects, the controller is further configured to perform a charging operation for the battery coupled to the first charging circuit by initially communicating by in-band control signals and subsequently communicated by out-of-band control signals.

Optionally, in an eighth aspect and in furtherance of any of the first to seventh aspects, subsequent to controlling the charging of the battery coupled to the first charging circuit according to the out-of-band control signals, the controller is further configured to control the charging of the battery by one of the one or more charging circuits according to in-band control signals.

Optionally, in a ninth aspect and in furtherance of any of the eighth aspect, the one or more charging circuits comprise a plurality of charging circuits, wherein charging of the battery by one of the charging circuits according to in-band control signals includes charging the battery by a second charging circuit coupled to the battery.

According to one other aspect of the present disclosure, an apparatus for transmitting power for a wireless charging system is provided. The apparatus includes a wireless power transmitter, an antenna, and a controller. The wireless power transmitter includes a transmitter coil, the wireless power transmitter configured to receive an input direct current (DC) voltage and in dependence thereon to use the transmitter coil to transmit power wirelessly to a wireless power receiver of a receiver circuit for the wireless charging system. The antenna is configured to receive and transmit out-of-band control signals. The controller is configured to communicate with the receiver circuit by in-band control signals exchanged through the transmitter coil of the wireless power transmitter and by the out-of-band control signals exchanged through the antenna, the controller further configured to control the charging of a battery by a first charging circuit of the receiver circuit according to the out-of-band control signals.

According to one other aspect of the present disclosure, a method of wirelessly charging a battery of a wireless electronic device is provided. The method. Includes transmitting a power waveform wirelessly from a wireless power transmitter of a transmitter circuit to a wireless power receiver of a receiver circuit, and receiving the power waveform wirelessly at the wireless power receiver of the receiver circuit from the wireless power transmitter of the transmitter circuit. An out-of-band communication channel is established between the wireless power transmitter and the wireless power receiver and out-of-band control signals are exchanged between an antenna of the transmitter circuit and an antenna of the receiver circuit via the out-of-band communication channel. The receiver circuit produces a direct current (DC) output voltage from the received power waveform and a battery coupled to the receiver circuit is charged by the DC output voltage in response to the out-of-band control signals.

According to one other aspect of the present disclosure, a wireless electronic device is provided. The wireless electronic device includes a wireless power receiver circuit, one or more charging circuits, an antenna, electronic components, and a controller. The wireless power receiver circuit includes a receiver coil, the wireless power receiver circuit configured to use the receiver coil to receive power wirelessly from a wireless power transmitter and generate therefrom a direct current (DC) output voltage. The one or more charging circuits include a first charging circuit, each including a voltage input terminal and a charging output terminal, the voltage input terminal of each of the one or more charging circuits configured to accept the DC output voltage from the wireless power receiver circuit, and the charging output terminal of each of the one or more charging circuits configured to be coupled to a terminal of a battery to provide a corresponding charging current thereto. The antenna is configured to receive and to transmit out-of-band control signals. The electronic components are configured to draw current from the battery and configured to drawn current from the output of the first charging circuit while the first charging circuit is being used to charge the battery. The controller is configured to communicate with the wireless power transmitter by in-band control signals exchanged through the receiver coil of the wireless power receiver circuit and by the out-of-band control signals exchanged through the antenna, the controller further configured to control the charging by the first charging circuit of the battery coupled to the first charging circuit according to the out-of-band control signals.

According to one other aspect of the present disclosure, a method of wirelessly charging a battery of a wireless electronic device is provided. The method. Includes establishing an in-band communication channel between a transmitter circuit and a receiver circuit to exchange controls signals according to a Qi interface standard. The receiver circuit produces a direct current (DC) output voltage from a power waveform received from the transmitter circuit. A battery coupled to the receiver circuit is charged by the DC output voltage in response to in-band control signals exchanged between the transmitter circuit and the receiver circuit according to a Qi interface standard. An out-of-band communication channel is subsequently established between the wireless power transmitter and the wireless power receiver though control signals exchanged using the in-band communication channel. Subsequently the battery coupled to the receiver circuit is charged by the DC output voltage in response to out-of-band control signals exchanged between the transmitter circuit and the receiver circuit.

Embodiments of the present technology described herein provide improvements to existing wireless battery charging systems. Such embodiments can be used to reduce interference with wireless communication from a wireless power RX to a transmitter of the wireless power. The interference may be due to transient currents drawn by a load powered by the battery. The interference may be reduced while an open-loop DC-DC converter is being used to charge a battery.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

FIGS. 6A-6C are graphs of various waveforms to illustrate how the load can interfere with communication in the system of FIG. 3 when charging the battery using the open-loop DC-DC converter.

FIGS. 7A and 7B are graphs to illustrate how transient currents drawn by the load may impact wireless communication when using the system of FIG. 3.

DETAILED DESCRIPTION

The present disclosure will now be described with reference to the figures, which in general relate to wireless battery charging systems for wirelessly charging a rechargeable battery of an electronic device that includes a load powered by the battery, and methods for use therewith.

Figure 1:
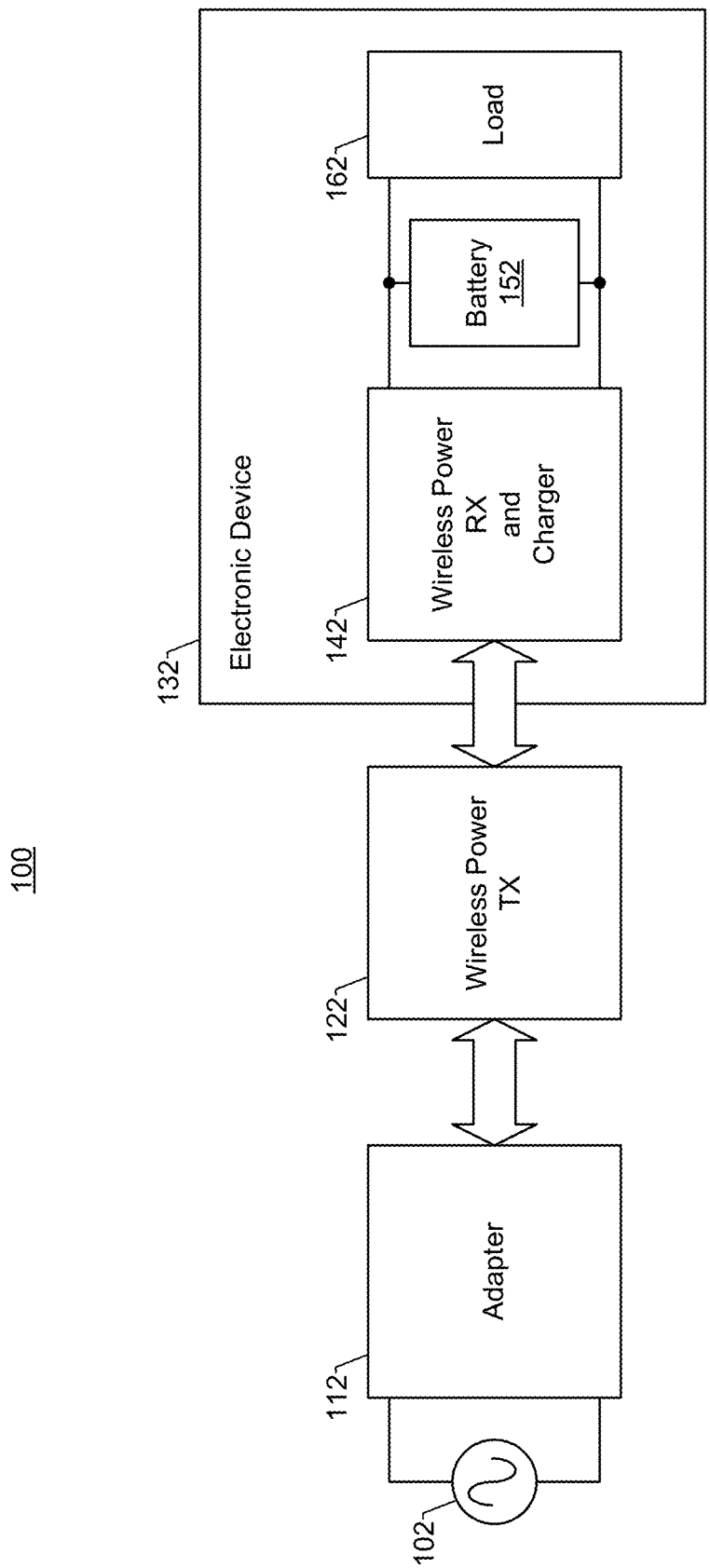
FIG. 1 illustrates an example wireless battery charging system.

FIG. 1 illustrates an example wireless battery charging system 100, which can be a Qi-standard wireless battery charging system, but is not limited thereto. The Qi-standard is an open interface standard developed by the Wireless Power Consortium (WPC) that defines wireless power transfer using inductive charging over distances of up to 4 cm (1.6 inches). A Qi-standard wireless battery charging system typically uses a charging pad and a compatible battery powered device, which is placed on top of the pad, charging via resonant inductive coupling.

Referring to FIG. 1, the example wireless battery charging system 100 is shown as including an adaptor 112, a wireless power transmitter (TX) 122, and a wireless power receiver (RX) and charger 142. As can be appreciated from FIG. 1, the wireless power RX and charger 142 is shown as being part of an electronic device 132 that also includes a rechargeable battery 152 and a load 162 that is powered by the battery 152. Since the electronic device 132 is powered by a battery, the electronic device 132 can also be referred to as a battery-powered device 132. The load 162 can include, e.g., one or more processors, displays, transceivers, and/or the like, depending upon the type of the electronic device 132. The electronic device 132 can be, for example, a mobile smartphone, a tablet computer, or a notebook computer, but is not limited thereto. The battery 152, e.g., a lithium ion battery, can include one or more electrochemical cells with external connections provided to power the load 162 of the electronic device 132.

The adaptor 112 converts an alternating current (AC) voltage, received from an AC power supply 102, into a direct current (DC) input voltage (Vin). The AC power supply 102 can be provided by a wall socket or outlet or by a power generator, but is not limited thereto. The wireless power TX 122 accepts the input voltage (Vin) from the adaptor 112 and in dependence thereon transmits power wirelessly to the wireless power RX and charger 142. The wireless power TX 122 can be electrically coupled to the adaptor 112 via a cable that includes a plurality of wires, one or more of which can be used to provide the input voltage (Vin) from the adaptor 112 to the wireless power TX 122, and one or more of which can provide a communication channel between the adaptor 112 and the wireless power TX 122. The communication channel can allow for wired bi-directional communication between the adaptor 112 and the wireless power TX 122. The cable that electrically couples the adaptor 112 to the wireless power TX 122 can include a ground wire that provides for a common ground (GND). The cable between the adaptor 112 and the wireless power TX 122 is generally represented in FIG. 1 by a double-sided arrow extending between the adaptor 112 and the wireless power TX 122. Such a cable can be, e.g., a universal serial bus (USB) cable, but is not limited thereto.

The wireless power RX and charger 142, via an inductive coupling, receives power wirelessly from the wireless power TX 122 and uses the received power to charge the battery 152. The wireless power RX and charger 142 can also wirelessly communicate bi-directionally with the wireless power TX 122 using in-band communications defined by the Qi standard. In FIG. 1 a double-sided arrow extending between the wireless power TX 122 and the wireless power RX and charger 142 is used to generally represent the wireless transfer of power and communications therebetween.

Figure 2:
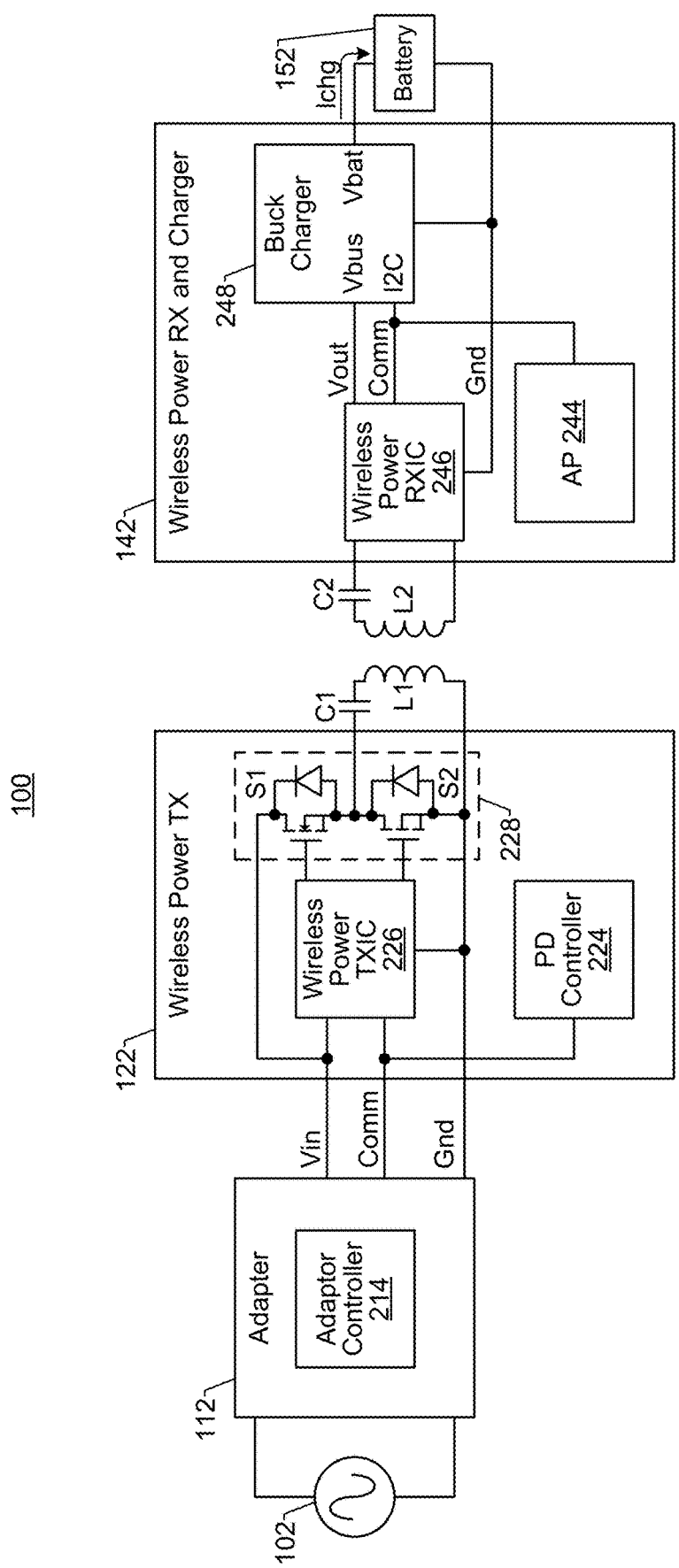
FIG. 2 illustrates additional details of the example wireless battery charging system introduced in FIG. 1.

FIG. 2 illustrates additional details of the wireless battery charging system 100 introduced in FIG. 1. To make FIG. 2 less crowded, the load 162 that is powered by the battery 152 is not shown, and the electronic device 132 within which the wireless power RX and charger 142 is included is not shown. Referring to FIG. 2, the adaptor 112 is shown as including an adaptor controller 214. The adaptor 112 can include an AC/DC converter (not specifically shown) that converts the AC voltage provided by the power supply 102 to the DC input voltage (Vin) that is provided by the adaptor 112 to the wireless power TX 122. Such an AC/DC converter can be or include a full-wave rectifier, for example, but is not limited thereto. The adaptor controller 214 can include, e.g., a processor and a transceiver that sends and receives communication signals to and from the wireless power TX 122.

In FIG. 2, the wireless power TX 122 is shown as including a power delivery (PD) controller 224, a wireless power transmitter integrated circuit (TXIC) 226, and a half-bridge inverter 228. The half-bridge inverter 228 is shown as being connected between a high voltage rail (that is at the input voltage (Vin)) and ground (GND). The PD controller 224 can include, e.g., a processor and a transceiver that sends and receives wireless communication signals to and from the adaptor 112. The function of the PD controller can sometimes be integrated into the TXIC 226. The wireless power TXIC 226 is shown as accepting the input voltage (Vin) from the adaptor 112 and controlling switches (S1 and S2) of the half-bridge inverter 228. The switches S1 and S2 are opened and closed at a desired frequency to generate an alternating signal at an output between the switches. The output of the inverter 228 is connected to an inductor L1 through a resonance capacitor C1. Since the inductor L1 functions as a transmitter coil, the inductor L1 can also be referred to as a transmitter coil. A full-bridge inverter that includes four switches can be used in place of the half-bridge inverter 228, as is known in the art. Other variations are also possible, as known in the art. The TXIC can include e.g. a processor and a transceiver that sends and receives communication signals to and from the wireless power RXIC and charger 142.

Still referring to FIG. 2, the wireless power RX and charger 142 is shown as including an application processor (AP) 244, a wireless power receiver integrated circuit (RXIC) 246, and a buck charger 248. The wireless power RXIC 246 is connected to an inductor L2 through a resonance capacitor C2. Since the inductor L2 functions as a receiver coil, the inductor L2 can also be referred to as a receiver coil. The inductors L1 and L2 provide for an inductive coupling between the wireless power TX 122 and the wireless power RX and charger 142, and more specifically, between the wireless power TXIC 226 and the wireless power RXIC 246. The inductive coupling can be used to transfer power from the wireless power TX 122 to the wireless power RX and charger 142, as well as to provide in-band bidirectional wireless communications therebetween. In the embodiment shown, power is wirelessly transferred from the wireless power TXIC 226 to the wireless power RXIC 246 using a single transmitter coil, but can alternatively be wirelessly transferred using more than one transmitter coil. Similarly, it is also possible that more than one receiver coil be used to wirelessly receive power at the receiving side of the inductive coupling. Other variations are also possible, as known in the art.

The wireless power RXIC 246 converts the AC voltage provided to it by the inductor L2 to a DC output voltage (Vout). The DC output voltage (Vout) is provided to the buck charger 248. The buck charger 248 can step down the output voltage (Vout) to an appropriate battery charging voltage (Vbat) that is used to charge the battery 152. For example, Vout may be 10 Volts (V), and Vbat may be 4.2V. For another example, Vout may be 10V, and Vbat may be 35V. These are just a few examples which are not intended to be limiting, as Vout and Vbat can have a myriad of different values. It would also be possible that the buck charger can step up the output voltage (Vout), i.e. working as a boost charger, or maintain the output voltage (Vout) so that the battery charging voltage (Vbat) is the same as Vout in alternative embodiments.

The buck charger 248, which can also be referred to as a buck converter, is an example of a closed-loop charger, in that the voltage and/or current at its output (i.e., at the terminal that produces Vbat, which terminal can be referred to as the Vbat terminal) is adjusted based on feedback produced by the buck charger 248 itself. The AP 244, which can also be referred to as a controller, can send and receive communication signals to and from the wireless power RXIC 246 and the buck charger 248. In certain embodiments, the AP 244 can utilize Inter-Integrated Circuit (I2C) serial bus communications to communicate with the wireless power RXIC 246 and the buck charger 248, however other communication interfaces and protocols can alternatively be used. The AP 244 can be, e.g., a processor of the electronic device 132, which processor can also be used to run applications, control communications, and the like, but is not limited thereto. It is also possible that the wireless power RX and charger 142 includes a controller, e.g., a PD controller, dedicated to controlling battery charging.

The buck charger 248 is shown as including a voltage input terminal, labeled Vbus, and a voltage output terminal, labeled Vbat. The voltage output terminal (labeled Vbat) is shown as being connected to a terminal of the rechargeable battery 152, which can also be referred to herein more succinctly as the battery 152. The buck charger 248 can charge the rechargeable battery 152 with a regulated current or voltage.

As noted above, a buck charger (e.g., 248) typically has a maximum efficiency of low 90s percent, which results in wasted energy. This wasted energy can cause the heating-up of the battery powered device (e.g., 132), such as a mobile smartphone, within which the buck charger is located, which is undesirable. Additionally, this inefficiency causes charging to take longer than it would otherwise take if the efficiency were higher.

Certain embodiments of the present technology, described below, can be used to increase the overall efficiency of a wireless battery charging system. Such embodiments are beneficial because they can reduce the wasted energy and thereby reduce the heating-up of the battery powered device (e.g., 132), such as a mobile smartphone, within which the buck charger is located. Additionally, such embodiments can reduce how long it takes to fully charge a battery (e.g., 152).

Figure 3:
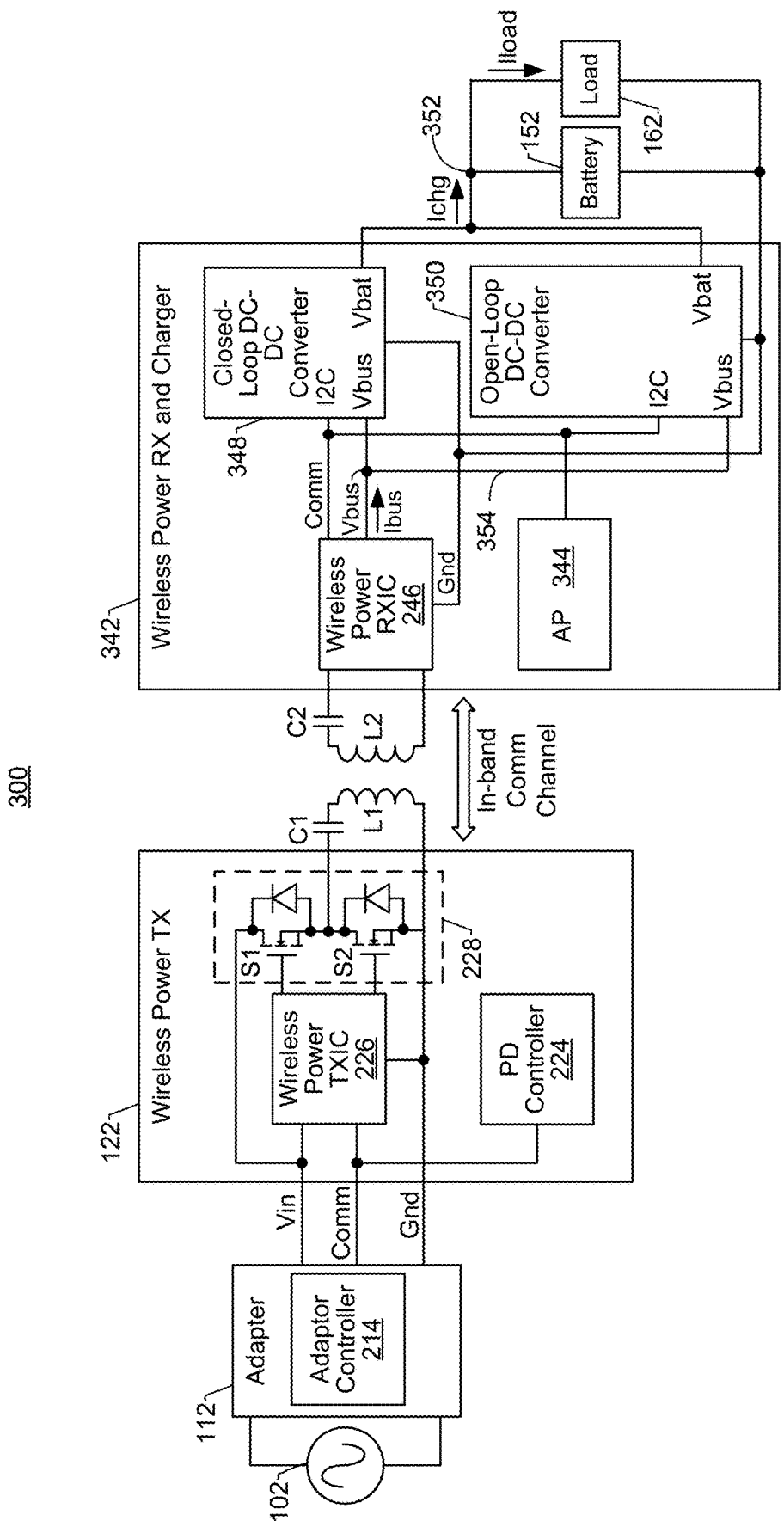
FIG. 3 illustrates a wireless battery charging system according to an embodiment of the present technology.

FIG. 3 illustrates a wireless battery charging system 300 according to an embodiment of the present technology. Elements in FIG. 3 that are the same or similar to those already discussed above with reference to FIGS. 1 and 2 are labeled the same and in certain instances are not discussed in detail because reference can be made to the above discussions of FIGS. 1 and 2.

Referring to FIG. 3, the example wireless battery charging system 300 is shown as including an adaptor 112, a wireless power TX 122, and a wireless power RX and charger 342. The wireless power RX and charger 342 can be included within an electronic device (e.g., a mobile smartphone, a tablet computer, or a notebook computer, but not limited thereto) that also includes a rechargeable battery 152 and a load 162 that is powered by the battery 152. The adaptor 112 includes an adaptor controller 214, and can include an AC/DC converter (not specifically shown) that converts the AC voltage provided by the power supply 102 to the DC input voltage (Vin) that is provided by the adaptor 112 to the wireless power TX 122. The adaptor controller 214 can include, e.g., a processor and a transceiver that sends and receives communication signals to and from the wireless power TX 122.

The wireless power TX 122 includes a PD controller 224, a wireless power TXIC 226, and an inverter 228. The PD controller 224 can include, e.g., a processor and a transceiver that sends and receives wireless communication signals to and from the adaptor 112. The wireless power TXIC 226 can accept the input voltage (Vin) from the adaptor 112 and controls switches (S1 and S2) of the inverter 228 to generate an alternating signal at an output thereof. Alternatively, a further DC-DC converter can be located between the adaptor 112 and the wireless power TX 122, the adaptor 112 can output a fixed DC voltage, and the further DC-DC converter can be controlled to adjust the input voltage (Vin) that is provided to the wireless power TX 122. The output of the inverter 228 is connected to the inductor L1 (which can also be referred to as a transmitter coil) through the resonance capacitor C1. A full-bridge inverter that includes four switches can be used in place of the half-bridge inverter 228, as is known in the art. Other variations are also possible, as known in the art.

Still referring to FIG. 3, the wireless power RX and charger 342 is shown as including an application processor (AP) 344, a wireless power RXIC 246, a closed-loop DC-DC converter 348, and an open-loop DC-DC converter 350. In FIG. 3, the wireless power RXIC 246 is connected to the inductor L2 (which can also be referred to as a receiver coil) through the resonance capacitor C2. The inductors L1 and L2 provide for an inductive coupling between the wireless power TXIC 226 and the wireless power RXIC 246, which inductive coupling is used to transfer power from the wireless power TX 122 to the wireless power RX and charger 342, as well as to prove wireless bidirectional communications therebetween. Based on the power that is received by the wireless power RXIC 246, the wireless power RXIC 246 outputs power to a power bus 354a. The wireless power RXIC 246 outputs a DC voltage (Vbus) and a DC current (Ibus) to the power bus 354a. In the embodiment shown, power is wirelessly transferred from the wireless power TXIC 226 to the wireless power RXIC 246 using a single transmitter coil, but can alternatively be wirelessly transferred using more than one transmitter coil. Similarly, it is also possible that more than one receiving coil be used to wirelessly receive power at the receiving side of the inductive coupling. Other variations are also possible, as known in the art.

Using the receiver coil L2 for communicating between the wireless power TXIC 226 and the wireless power RXIC 246 is referred to as in-band communication, as the receiver coil L2 is also used for receiving electrical power from the wireless power TXIC 226. Embodiments disclosed herein improve communication between the wireless power TX 122 and the wireless power RX and charger 342.

In one embodiment, the closed-loop DC-DC converter 348 is a buck charger. In one embodiment, the closed-loop DC-DC converter 348 is a boost charger. In one embodiment, the closed-loop DC-DC converter 348 is a buck-boost charger. In one embodiment, the open-loop DC-DC converter 350 is a switched capacitor charger. In one embodiment, the open-loop DC-DC converter 350 is a load switch charger. In one embodiment, the open-loop DC-DC converter 350 is a flash charging charger. The inclusion and selective use of the open-loop DC-DC converter 350 increases the overall efficiency of the wireless battery charging system 300, which effectively reduces the heating-up of the battery powered device (within which the DC-DC converters 348 and 350 are located), and effectively reduces the total amount of time it takes to fully recharge a rechargeable battery (e.g., 152). For example, a typical switched capacitor charger (e.g., 350) has an efficiency of 97%, which is more efficient than a typical buck charger (e.g., 348).

In accordance with certain embodiments of the present technology, during any given phase of a battery charging process (also referred to as a charging profile), only one of the two chargers 348 and 350 operates. For the closed-loop DC-DC converter 348 (e.g., buck converter) the voltage and/or current at its output (i.e., at the Vbat terminal) is adjusted based on feedback produced by the closed-loop DC-DC converter 348 itself. By contrast, for the open-loop DC-DC converter 350, the voltage and/or current at its output (i.e., at the Vbat terminal) is not adjusted based on feedback produced by the open-loop DC-DC converter 350 itself. The closed-loop DC-DC converter 348 may have better current and voltage regulation, and may be employed during low power charging phases. The open-loop DC-DC converter 350 does not have current and voltage regulation, and may be employed during high power charging phases. It is noted the term Vbat is used both to refer to the output terminal of a DC-DC converter (348 and 350), as well as the battery charging voltage output at that terminal, and the specific use of the term can be understood from the context of how the term is used.

The AP 344 is used to control the system 300 when the open-loop DC-DC converter 350 is used to charge the battery 152, in some embodiments. When the open-loop DC-DC converter 350 operates, the AP 344 controls the overall wireless battery charging system to operate in a closed-loop mode. In some embodiments, the AP 344 regulates a battery charging current (Ichg) or charging voltage when the open-loop DC-DC converter 350 is used. In a constant current charging state, the AP 344 regulates the battery charging current to follow a target value when the open-loop DC-DC converter 350 is used. In a constant voltage charging state, the AP 344 regulates the battery charging voltage to follow a target value when the open-loop DC-DC converter 350 is used.

In one embodiment, the AP 344 instructs the wireless power RXIC 246 to communicate information to the wireless power TXIC 226 in order to operate the overall wireless battery charging system to operate in a closed-loop mode when the open-loop DC-DC converter 350 is used. As one example, the communication is used to establish a value for Vin at the input of the wireless power TXIC 226. The AP 344 may also regulate the voltage (Vbus) at the output of the wireless power RXIC 246. Note that if wireless communication between the wireless power RXIC 246 and wireless power TXIC 226 are adversely affected, then control of the open-loop DC-DC converter 350 may be adversely affected, as well. Certain embodiments disclosed herein prevent the load 162 from interfering with this wireless communication when the open-loop DC-DC converter 350 is used to charge the battery 152

The load 162 is depicted as drawing a load current (Iload). When the battery 152 is not being charged, the battery 152 provides the load current (Iload) to the load 162. When the open-loop DC-DC converter 350 is being used to charge the battery 152, the open-loop DC-DC converter 350 and/or the battery 152 may provide the load current (Iload) to the load 162. It is possible for transient currents drawn by the load 162 to interfere with the in-band communication from the wireless power RXIC 246 to the wireless power TX 122 when the open-loop DC-DC converter 350 is charging the battery 152.

Figure 4:
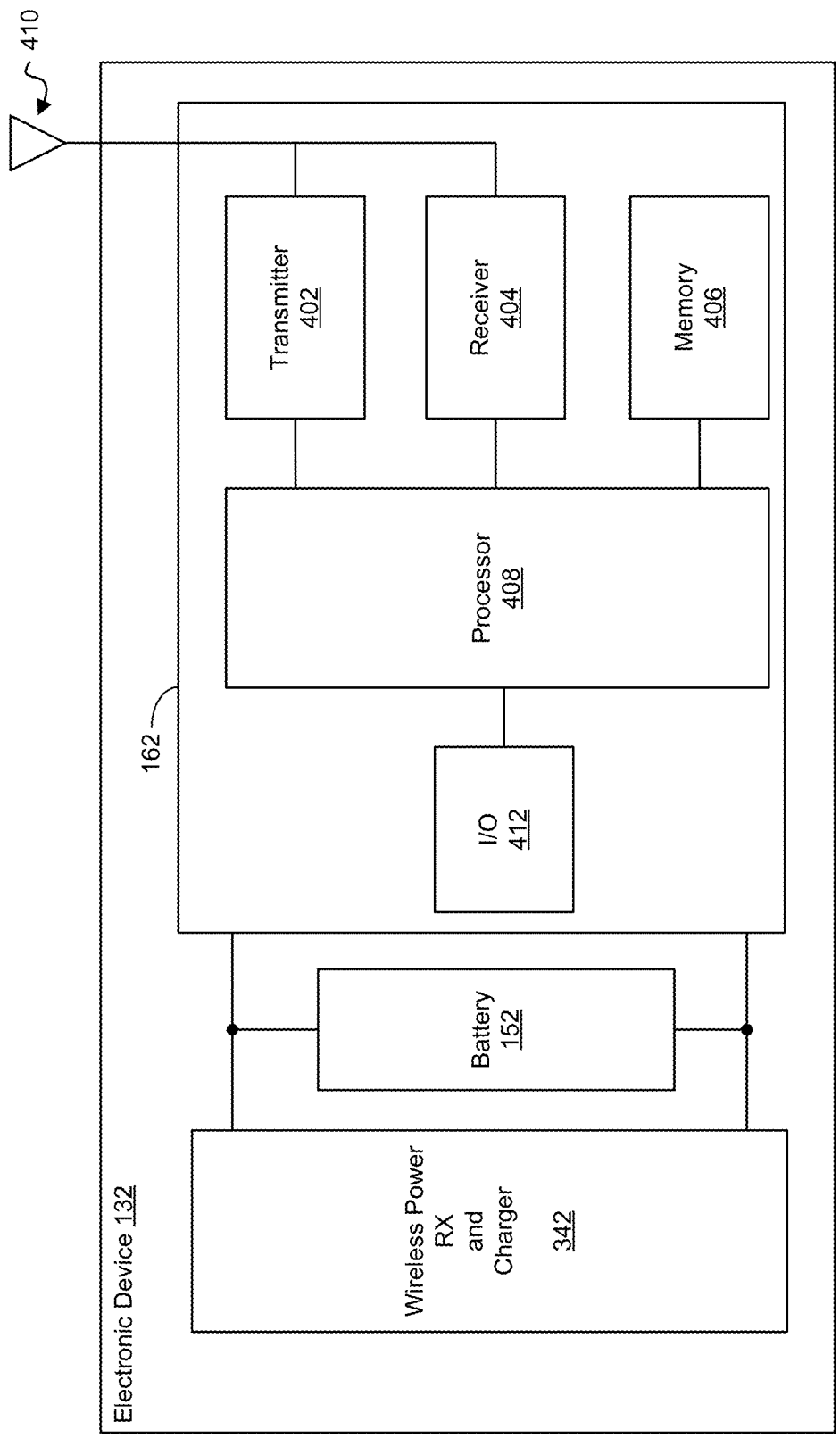
FIG. 4 illustrates example details of an electronic device that may implement the methods and teachings according to this disclosure.

FIG. 4 is an example electronic device 132 in which embodiments may be practiced. The electronic device 132 may for example be a wireless electronic device (e.g., mobile telephone), but may be other devices in further examples such as a desktop computer, laptop computer, tablet, hand-held computing device, automobile computing device and/or other computing devices. As shown in FIG. 4, the electronic device 132 is shown as including a load 162 comprising various electronic components, which include at least one transmitter 402, at least one receiver 404, memory 406, at least one processor 408, and at least one input/output device 412. The processor 408 can implement various processing operations of the electronic device 132. For example, the processor 408 can perform signal coding, data processing, power control, input/output processing, or any other functionality enabling the electronic device 132 to operate. The processor 408 may include any suitable processing or computing device configured to perform one or more operations. For example, the processor 408 may include a microprocessor, microcontroller, digital signal processor, field programmable gate array, or application specific integrated circuit.

The transmitter 402 can be configured to modulate data or other content for transmission by at least one antenna 410. The transmitter 402 can also be configured to amplify, filter and a frequency convert RF signals before such signals are provided to the antenna 410 for transmission. The transmitter 402 can include any suitable structure for generating signals for wireless transmission.

The receiver 404 can be configured to demodulate data or other content received by the at least one antenna 410. The receiver 404 can also be configured to amplify, filter and frequency convert RF signals received via the antenna 410. The receiver 404 is an RF signal receiver, in some embodiments. The receiver 404 can include any suitable structure for processing signals received wirelessly. The antenna 410 can include any suitable structure for transmitting and/or receiving wireless signals. The same antenna 410 can be used for both transmitting and receiving RF signals, or alternatively, different antennas 410 can be used for transmitting signals and receiving signals.

It is appreciated that one or multiple transmitters 402 could be used in the electronic device 132, one or multiple receivers 404 could be used in the electronic device 132, and one or multiple antennas 410 could be used in the electronic device 132. Although shown as separate blocks or components, at least one transmitter 402 and at least one receiver 404 could be combined into a transceiver. Accordingly, rather than showing a separate block for the transmitter 402 and a separate block for the receiver 404 in FIG. 4, a single block for a transceiver could have been shown.

The electronic device 132 further includes one or more input/output devices 412. The input/output devices 412 facilitate interaction with a user. Each input/output device 412 includes any suitable structure for providing information to or receiving information from a user, such as a speaker, microphone, keypad, keyboard, display, or touch screen.

In addition, the electronic device 132 includes at least one memory 406. The memory 406 stores instructions and data used, generated, or collected by the electronic device 132. For example, the memory 406 could store software or firmware instructions executed by the processor(s) 408 and data used to reduce or eliminate interference in incoming signals. Each memory 406 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

During charging of the battery 152 by the wireless power RX and charger 342, the load 162 may draw transient currents. These transient currents could be provided by the battery 152 and/or the wireless power RX and charger 342. When charging the battery 152, the wireless power RX and charger 342 may communicate with the wireless power TX 122. More specifically, the wireless power RX and charger 342 may use the receiver coil L2 to send information to the wireless power TX 122 using the in-band communication channel. It is possible for the transient currents drawn by the load 162 to interfere with the communication from the wireless power RX and charger 342 to the wireless power TX 122 when the open-loop DC-DC converter 350 is charging the battery 152. Certain embodiments disclosed herein reduce such communication interference due to transient currents drawn by the load 162.

Figure 5:
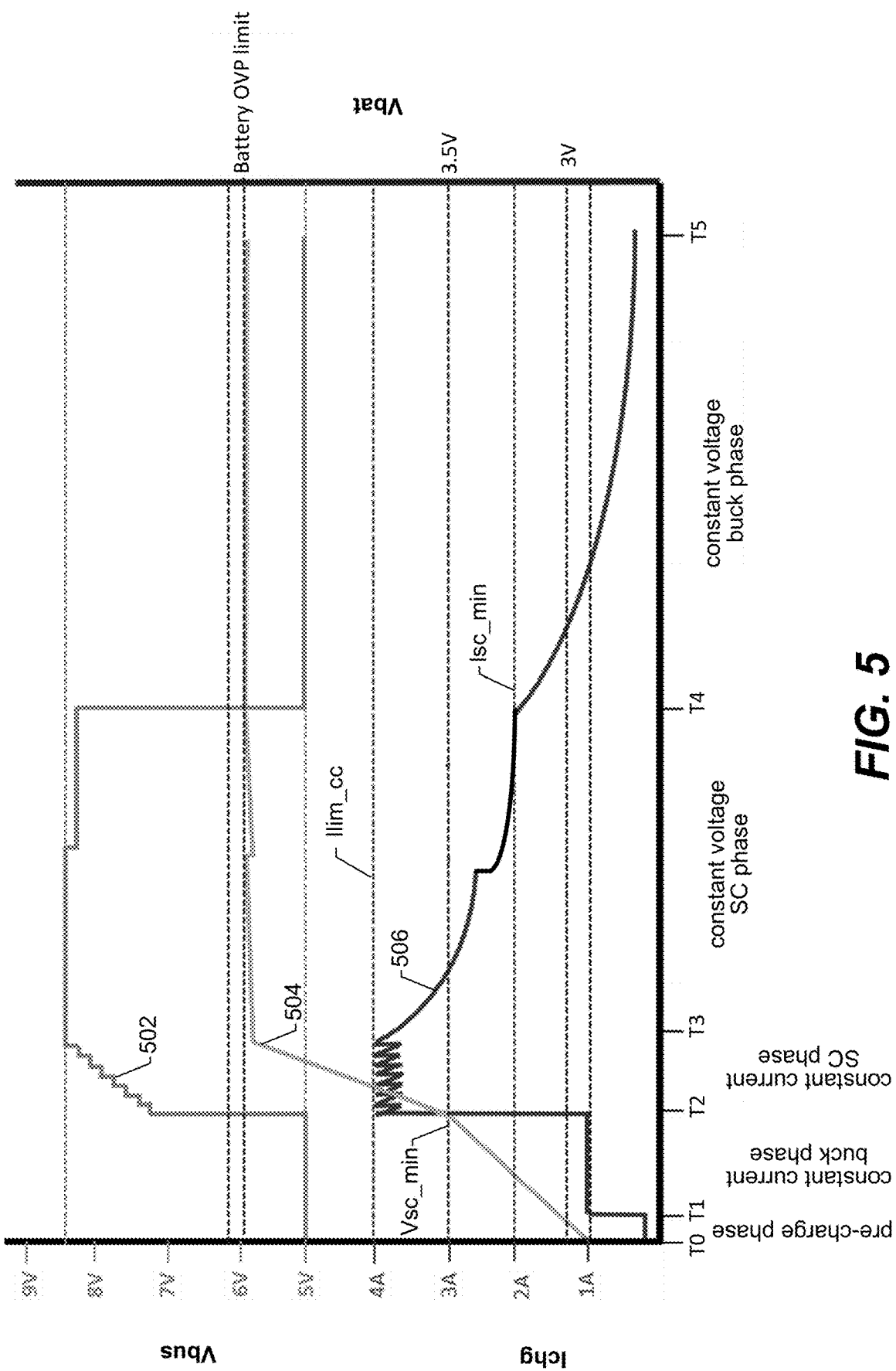
FIG. 5 illustrates a graph that shows an example wireless battery charging profile for the wireless battery charging system shown in FIG. 3.

FIG. 5 shows an example charging profile of the wireless battery charging system 300, accordance to an embodiment of the present technology. More specifically, the graph in FIG. 5 includes a horizontal axis (i.e., the x-axis) that corresponds to time, and a vertical axis (i.e., the y-axis) on the left that corresponds (at the lower portion) to the battery charging current (Ichg), and corresponds (at the upper portion) to the output voltage (Vbus) of the wireless power RXIC 246 in FIG. 3. The vertical axis (i.e., the y-axis) on the right corresponds to the battery charging voltage (Vbat). The battery charging current (Ichg) is the current provided to the battery at the Vbat terminal of the enabled one of the DC-DC converters 348 or 350 in FIG. 3. The battery charging voltage (Vbat) is the voltage provided to the battery 152 at the Vbat terminal of the enabled one of the DC-DC converters 348 or 350 in FIG. 3. In FIG. 5 and other FIGS., the following acronyms are sometimes used: SC for switched capacitor; CC for constant current; CV for constant voltage; and OVP for over voltage protection. In the example of FIG. 5, the closed-loop DC-DC converter 348 is a buck converter and the open-loop DC-DC converter 350 is a switched capacitor converter.

As can be appreciated from FIG. 5, the charging profile shown therein includes five charging phases, including a pre-charge phase (between times T0 and T1), a constant current buck phase (between times T1 and T2), a constant current switched capacitor phase (between times T2 and T3), a constant voltage switched capacitor phase (between times T3 and T4), and a constant voltage buck phase (between times T4 and T5). The constant current buck phase (between times T1 and T2) can be referred to more generally as the constant current closed-loop charging phase; the constant current switched capacitor phase (between times T2 and T3) can be referred to more generally as the constant current open-loop charging phase; the constant voltage switched capacitor phase (between times T3 and T4) can be referred to more generally as the constant voltage open-loop charging phase; and the constant voltage buck phase (between times T4 and T5) can be referred to more generally as the constant voltage closed-loop charging phase. The waveform labeled 502 shows an example of how the output voltage (Vbus) of the wireless power RXIC 246 in FIG. 3 changes from one phase to the next; the waveform labeled 504 shows how an example of how the battery charging voltage (Vbat) changes from one phase to the next; and the waveform labeled 506 shows how an example of how the battery charging current (Ichg) changes from one phase to the next.

The waveform labeled 502 shows that the voltage (Vbus) on the power bus 354 at the output of the wireless power RXIC 246 remains constant (e.g., at 5V) during the pre-charge phase (between times T0 and T1) and during the constant current buck phase (between times T1 and T2). The output voltage (Vbus) is shown as increasing from 5V to about 7.2V at time T2, and then gradually stepping up from 7.2V to about 8.4V during the constant current switched capacitor phase (between times T2 and T3). The output voltage (Vout) then stays at about 8.4V for a portion of the constant voltage switched capacitor phase (between times T3 and T4), and gradually drops to about 8.2V for a remaining portion of the constant voltage switched capacitor phase. The output voltage (Vbus) is shown as decreasing from 8.2V back to 5V at time T4 and remaining at 5V during the constant voltage buck phase (between times T4 and T5).

Still referring to FIG. 5, the waveform labeled 504 shows that the battery charging voltage (Vbat) steadily increases at a first rate from about 3V to about 3.5V during the pre-charge phase (between times T0 and T1) and during the constant current buck phase (between times T1 and T2). The battery charging voltage (Vbat) is shown as steadily increasing at a second rate (that is greater than the first rate) from about 3.5V to about 4.2V during the constant current switched capacitor phase (between times T2 and T3). The battery charging voltage (Vbat), during the constant voltage switched capacitor phase (between times T3 and T4), very slowly increases to a battery over voltage protection (OVP) level, then is reduced slightly and then again slowly increases to the battery OVP level. The battery charging voltage (Vbat) is shown as remaining constant (just below the battery OVP level) during the constant voltage buck phase (between times T4 and T5).

The waveform labeled 506 shows that the battery charging current (Ichg) stays constant at about 0.2 Amps (A) during the pre-charge phase (between times T0 and T1). At time T1 the battery current (Ichg) jumps up to about 1 A and stays constant at about 1 A during the constant current buck phase (between times T1 and T2). The battery charging current (Ichg) is shown as varying between about 4 A and 3.7 A in a sawtooth manner during the constant current switched capacitor phase (between times T2 and T3). The battery charging current (Ichg), during the constant voltage switched capacitor phase (between times T3 and T4), decreases from about 4 A to about 2 A in a parabolic manner, with a brief decrease corresponding to when the battery charging voltage (Vbat) reached the OVP level. The battery charging current (Ichg) is shown as decreasing from about 2 A to the termination current close to 0 A in a parabolic manner during the constant voltage buck phase (between times T4 and T5).

Returning to FIG. 3, as discussed above the system 300 includes wireless power RX and charger 342, which is connected to a battery 152 and a load 162. The wireless power RXIC 246 of the wireless power RX and charger 342 receives power wirelessly from the wireless power TXIC 226. In addition to using the inductive coupling to transfer power from the wireless power TX 122 to the wireless power RX and charger 342, the wireless channel between the wireless power TXIC 226 and the wireless power RXIC 246 through coils L1 and L2 can also be used to provide in-band bidirectional wireless communications therebetween. This allows the wireless power RX and charger 342 to wirelessly communicate bi-directionally with the wireless power TX 122 using in-band communications, such as those defined by the Qi standard or other suitable communication protocol, as represented by the double-sided arrow extending between L1 and L2.

FIGS. 6A-6C are graphs of various waveforms to illustrate how the load 162 can interfere with in-band communication in the system 300 of FIG. 3 when charging the battery 152 using the open-loop DC-DC converter 350. In particular, transient current drawn by the load 162 can interfere with in-band communication in which the receiver coil L2 is used to communicate information to the wireless power TXIC 226 by through the in-band communication channel. The waveforms are for various currents and voltages when the open-loop DC to DC converter 350 is being used to charge the battery 152. The horizontal axis in each diagram 6A-6C represents time. The time axes are aligned with each other and cover the same time period. The units of time are milliseconds, in this example. The vertical axis in FIG. 6A represents current for waveform 602. The vertical axis in FIG. 6B represents voltage for waveforms 604 and 606. The vertical axis in FIG. 6C represents current for waveforms 610 and 612.

Waveform 602 in FIG. 6A represents a current (Iload) drawn by the load 162. Up until time 2.0 (ms) the load current is steady. Therefore, the load current is not transient in nature before time 2.0 (ms), and does not interfere with in-band communication using the receiver coil L2. After time 2.0 (ms), the load current is periodic, with a frequency of about 2000 Hz, in this example. That is, there are periodic changes in the amount of current drawn by the load 162. Thus, after time 2.0 (ms), the load current is transient in nature in that it has one or more momentary variations in current magnitude. Note that the load current could be provided by the open-loop DC to DC converter 350 and/or the battery 152.

Waveform 610 in FIG. 6C represents the current (Ichg) that is provided by the output of the open-loop DC to DC converter 350. Waveform 612 in FIG. 6C represents the current (Ibus) that is on the power bus 354 at the output of the wireless power RXIC 246. In FIG. 3, the power bus 354 connects the output of the wireless power RXIC 246 to the input of open-loop DC to DC converter 350, such that the current at the input of the open-loop DC to DC converter 350 is the same as the current (Ibus) on the power bus 354 at the output of the wireless power RXIC 246. Note that this assumption is based on operating the open-loop DC to DC converter 350 while the closed-loop DC to DC converter 348 is not enabled and hence does not input a current from or output a current to the power bus 354. It is further assumed that the open-loop DC to DC converter 350 in this particular drawing is a switched capacitor charger with voltage down conversion ratio of 2:1, such that Ibus (as shown by the waveform 612) is approximately half in value compare to the Ichg (as shown by the waveform 610). It is noted that during steady state (prior to 2 ms) Iload (as shown by the waveform 602) is lower in value as compared to Ichg (as shown by the waveform 610). This indicates that the excess current flows into the battery 152, and the battery is being charged. After 2 ms, when Iload (as shown by the waveform 602) presents high transient current, Iload has a higher value as compared to Ichg (as shown by the waveform 610). This because at this point, the battery 152 is no longer being charged. Instead, the battery 152 is discharging and supplementing the additional current demanded by the load 162 (as shown by the waveform 602) that cannot be provided by the current (Ichg) provided by the DC-DC open-loop converter 350.

Waveform 604 in FIG. 6B represents the voltage (Vbat) at the terminal 352 connected to the battery 152. In FIG. 3, the voltage at the terminal 352 to the battery 152 is the same as the voltage at the output (Vbat) of the open-loop DC to DC converter 350. Waveform 606 in FIG. 6C represents the voltage (Vbus) that is on the power bus 354 at the output of the wireless power RXIC 246. In FIG. 3, the voltage at the input of open-loop DC to DC converter 350 is the same as the voltage (Vbus) that is output by the wireless power RXIC 246 to the power bus 354. It is further assumed that the open-loop DC to DC converter 350 in this particular drawing is a switched capacitor charger with voltage down conversion ratio of 2:1, such that the voltage Vbus (as depicted by waveform 606) is approximately twice in value compare to the voltage Vbat (as depicted by waveform 604). During steady state (before 2 ms), Vbat is maintained at a level such that the open-loop DC to DC converter 350 provides a steady current charging the battery. When load transient occurs at 2 ms and periodically thereafter, it is noted that the battery voltage Vbat (as depicted by waveform 604) periodically decreases. Thus, Vbat periodically decreases as compared to its value before 2 ms (when there is no load transients). This is because at this point, the battery 152 is discharging and supplementing the additional current demanded by the load (Iload) that cannot be provided by the current (Ichg) provided by the DC-DC open-loop converter 350. As the battery 152 discharges, the voltage at the battery terminal decreases.

When the battery is being charged (e.g., when there is not a transient load current), the voltage drop caused by internal resistance of the battery may add on top of the battery core voltage. In contrast, when the battery is being discharged (e.g., when there is a transient load current), the voltage drop caused by internal resistance of the battery may subtract from the battery core voltage. The net effect is that the battery voltage may oscillate (see waveform 604) in response to the transient load current. This oscillation in battery voltage may be enough to cause a sudden change in current from the DC-DC open-loop converter 350 since this current may depend on voltage difference between the output of the wireless power RXIC 246 and the battery voltage.

Thus, waveforms 604 and 610 show that both the voltage and current at the output of the open-loop DC to DC converter 350 vary in response to the transitions in the load current, and the transition in battery voltage (Vbat) as a result of it. Because the DC to DC converter 350 operates in an open-loop, the variations in voltage and current at its output (Vbat) will cause variations in voltage and current at its input (Vbus). Thus, when the voltage (shown as waveform 604) at the output of the open-loop DC to DC converter 350 rises and falls, the voltage (shown as waveform 606) at the input of the open-loop DC to DC converter 350 rises and falls. Likewise, when the current (shown as waveform 610) at the output of the open-loop DC to DC converter 350 rises and falls, the current (shown as waveform 612) at the input of the open-loop DC to DC converter 350 rises and falls.

Referring back to FIG. 3, when the voltage at the input of the open-loop DC to DC converter 350 rises and falls, the voltage (Vbus) on the power bus 354 at the output of the wireless power RXIC 246 rises and falls. Likewise, when the current at the input of the open-loop DC to DC converter 350 rises and falls, the current (Ibus) in the power bus 354 at the output of the wireless power RXIC rises and falls. Such changes in the voltage and/or current at the output of the wireless power RXIC 246 cause changes in the current through the receiver coil L2, which induce changes in the current Ip in coil L1 of the wireless power TXIC 226. In-band communication from the wireless power RXIC 246 to the wireless power TXIC 226 depends on the wireless power TXIC 226 detecting small changes in the current Ip in coil L1. The TXIC 226 can extract communication signals from the wireless power RX and charger 342 through these changes in the current Ip in coil L1 of the wireless power TXIC 226. The changes in the current Ip that are induced by the transient load current can therefore interfere with the in-band communication channel and the control signals exchanged over this channel.

FIGS. 7A and 7B are graphs to illustrate how transient currents drawn by the load 162 may impact wireless communication when using the receiver coil L2 of FIG. 3. FIG. 7A depicts packet failure rate (vertical axis) versus load current frequency (horizontal axis). The packets refer to packets of information that are sent from the wireless power RXIC 246 to the wireless power TXIC 226 using, for example, the Qi standard. Line 702 represents the packet failure rate. Line 704 represents the approximate frequency of in-band wireless communication from the wireless power RXIC 246 to the wireless power TXIC 226. When the frequency of the transient current is near the frequency of in-band wireless communication, the packet failure rate is at its highest, in this example.

Embodiments disclosed herein can reduce the packet failure rate, which includes reducing the packet failure rate to zero. More specifically, an additional out-of-band communication channel is provided between the wireless power TX 122 and the wireless power RX and charger 342, moving the frequency of the wireless communications to a frequency that will not suffer from the interference illustrated in FIGS. 7A and 7B for the frequency band of in-band wireless communication represented at line 704. In one embodiment, when the open-loop DC-DC converter 350 is being used to charge the battery 152, the out-of-band communication channel can be used to exchange control signals between the wireless power TX 122 and the wireless power RX and charger 342, leading to a reduction in the packet failure rate.

FIG. 7B depicts complete communication failure rate (vertical axis) versus load current frequency (horizontal axis). For example, the load interference may be so severe that even remedial actions such as resending failed packets may be unsuccessful at providing communication. Line 706 represents the complete communication failure rate. Line 704 again represents the approximate frequency of in-band wireless communication from the wireless power RXIC 246 to the wireless power TXIC 226. When the frequency of the transient current is near the frequency of in-band wireless communication, the complete communication failure rate is at its highest, in this example. Embodiments disclosed herein can reduce the complete communication failure rate, which includes reducing the complete communication failure rate to zero.

Figure 8:
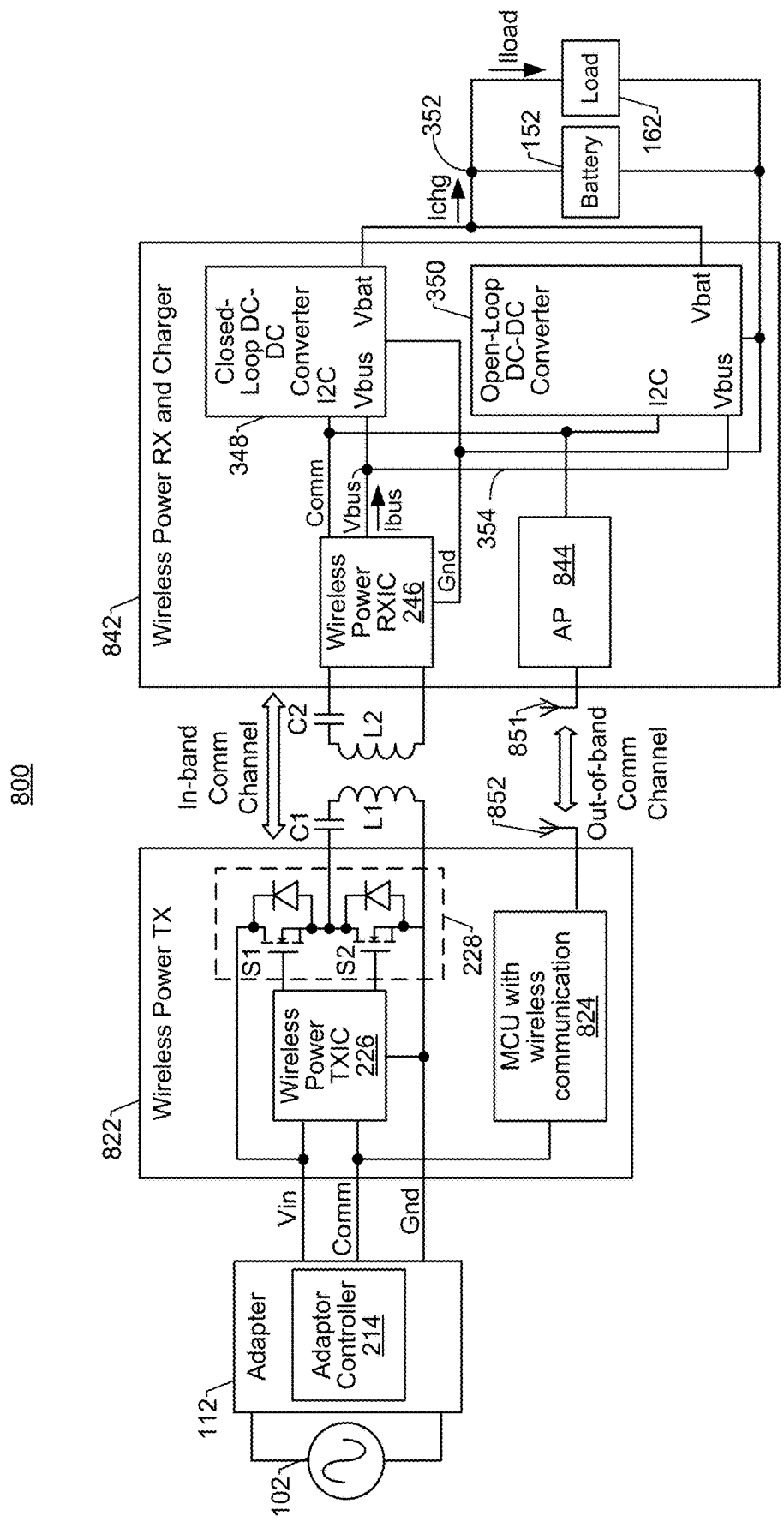
FIG. 8 illustrates a wireless battery charging system for an embodiment incorporating an out-of-band communication channel.

FIG. 8 illustrates a wireless battery charging system 800 according to an embodiment of the present technology. Elements in FIG. 8 that are the same or similar to those already discussed above with reference to FIGS. 1-3 are labeled the same and in certain instances are not discussed in detail because reference can be made to the above discussions of FIGS. 1-3.

Relative to wireless battery charging system 300 of FIG. 3, wireless battery charging system 800 of FIG. 8 now includes an antenna 852 for the wireless power TX 822 and an antenna 851 for the wireless power RX and charger 842 to provide an out-of-band communication channel. The antenna 852 is connected to a micro-control unit (MCU) with wireless communication capability 824 and the antenna 851 is connected to the AP 844, which also has wireless communication capability in some embodiments, allowing the MCU with wireless communication 824 and the AP 844 to exchange control signals over the out-of-band communication channel, avoiding the problems described above with respect to FIGS. 6A-6C, 7A, and 7B.

In various embodiments, the MCU with wireless communication 824 in the wireless power TX 822 can have a wireless communication capability such as Bluetooth (including BLE (Bluetooth low energy)). In some embodiments, a separate wireless communication module could be couple to a MCU that does not have wireless communication capability to form the with wireless communication 824. Similarly, the AP 844 of the wireless power RX and charger 842 commonly already has some wireless communication capability, such as Bluetooth, as the device of which the wireless power RX and charger 842 is part (such as a mobile telephone) will frequently already have some sort of wireless capability. In other embodiments, instead of, or addition to, Bluetooth (including BLE (Bluetooth low energy)), other wireless communication protocols such Wi-Fi or near field communication (NFC) can be used for the out-of-band communication channel. In some embodiments, a separate wireless communication module could be coupled to the AP to enable out of band communication capability.

When charging the battery 152 through the closed-loop charger 348 (e.g., buck charger), the in-band communication can be used for the system control (including the wireless power transfer control), as the closed-loop charger 348 will typically have a well-integrated control loop that reduces the sort of problems illustrated with respect to FIGS. 6A-6C, 7A, and 7B. When charging the battery through the open-loop charger 350 (e.g., switched capacitor charger), the in-band communication is disabled or unused, and the out-of-band wireless communication is enabled for the system control (including the wireless power transfer control). In other embodiments, the out-of-band communication channel can be used for the closed-loop charger 348 as well as the open-loop charger 350, so that the system need not switch back to the in-band communication channel once operating in the out-of-band communication channel.

Even for embodiments where the out-of-band communication channel is used for the closed-loop charger 348 as well the open-loop charger 350, during the start-up or initialization process when the wireless power TX 822 is first put into communication with the wireless power RX and charger 842, the initial exchange of communications can be through the in-band communication channel. By using the in-band communication channel initially, this allows for the case of when battery 152 is dead. If the battery is dead, the wireless power RX and charger 842 can still wirelessly receive the power waveform from which the wireless power RXIC 246 can extract control signals from the wireless Power TX 822. FIGS. 9-13 consider the control signals exchanged by the wireless power RX and charger 842 and the wireless power TX 822 in these processes further.

Figure 9:
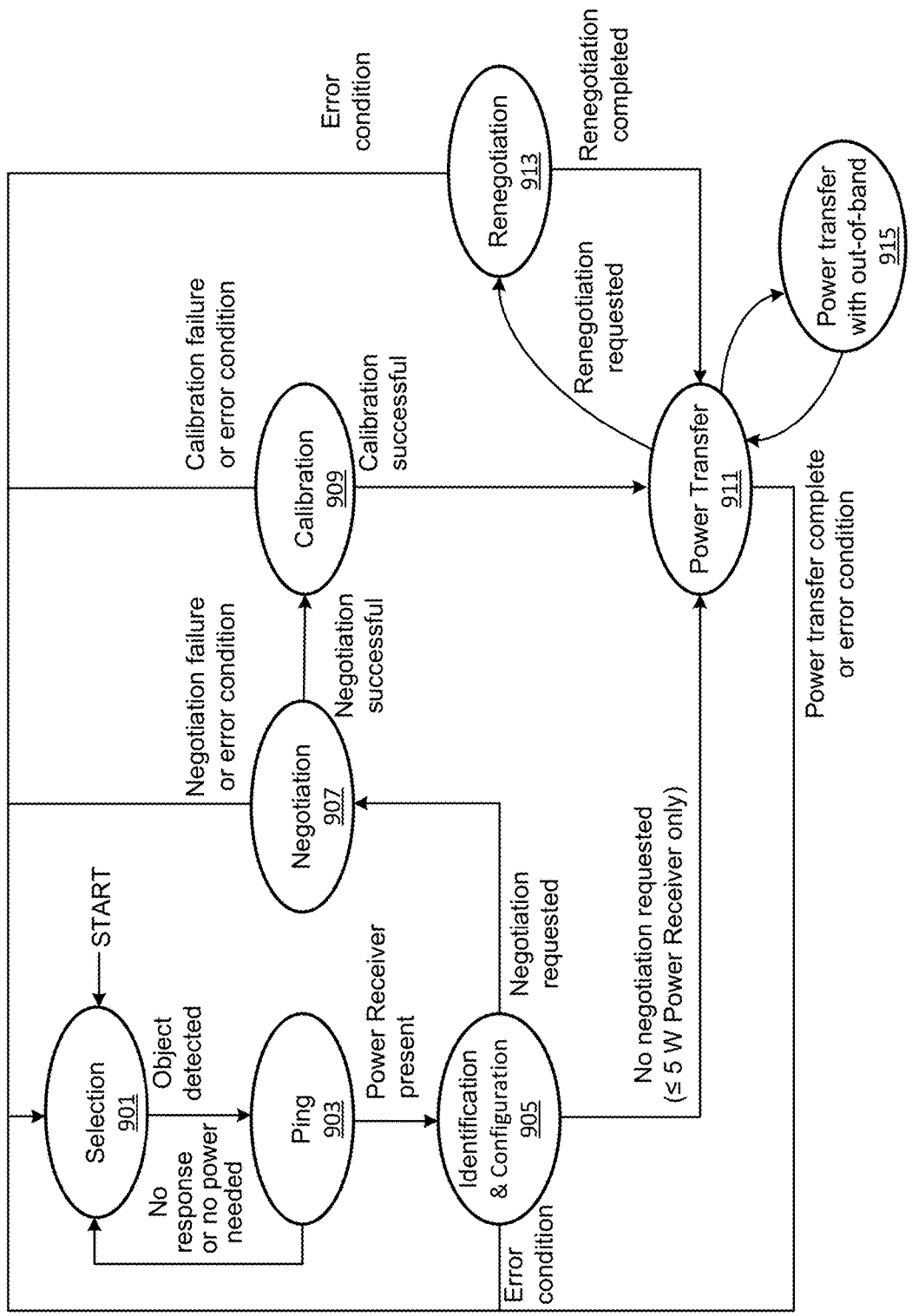
FIG. 9 illustrates a modification to the existing Qi standard by introducing a new state of power transfer with out-of-band communication.

The out-of-band communication channel for exchanging control signals in a wireless charging system can be implemented in a number of different ways depending on the embodiment. FIG. 9 considers an embodiment based on the Qi-standard wireless battery charging system. More specifically, FIG. 9 illustrates a modification to the existing Qi standard by introducing a new state of power transfer with out-of-band communication. The state diagram of FIG. 9 is compatible with the existing Qi standard, differing by the inclusion of power transfer with out-of-band (OOB) communication mode at 915.

Considering FIG. 9 further, the state diagram starts by going to selection 901 where, if an object is detected for charging, it is pinged at 903. If there is no response to the ping, or the detected object needs no power, the state diagram loops back to 901. If, in response to the ping at 903, a power receiver is present (and in need of power), identification and configuration follows at 905. As with others of the states in FIG. 9, the identification and configuration at 905 is considered in further detail with respect to FIGS. 10-13.

At identification and configuration state 905, if negotiation is requested the diagram goes to negotiation at 907, while if an error condition is identified the state diagram loops back to selection 901. If no negotiation is requested at 905, which in the Qi-standard is allowed for a power receiver of 5 Watts or less, the diagram can go straight to the power transfer state 915. At negotiation state 907, a successful negotiation goes to calibration state 909, while a negotiation failure or error condition will again loop back to the selection state 901. If the calibration at 909 is successful, the diagram goes to the power transfer state 911, with a calibration failure or error condition again looping back to the selection state 901.

Once at the power transfer state 911, whether from calibration state 909 or identification and configuration state 905, in state 911 power is transferred wirelessly from the wireless power TXIC 226 and wireless power RXIC 246 of system 800 with the control signals exchanged by the in-band communication channel between the Wireless Power TX 822 and Wireless power RX and Charger 842. This can be done according to the current Qi-wireless standard, continuing until the power transfer is complete (i.e., battery 152 is charged) or an error condition arises, and the diagram returns to state 901. If a renegotiation is requested from state 911, the diagram goes to renegotiation state 913, returning to power transfer state 911 once the renegotiation is complete (or looping back to selection state 901 in case of an error condition.)

Although the illustration of FIG. 9 is for the Qi-standard, similar sorts of state diagrams would correspond to other wireless charging protocols. In any case, the power transfer state 911 would be controlled using the in-band communication channel between the wireless power RX and charger 842 and the wireless power TX 822. According to certain embodiments presented here, the power transfer with out-of-band communication state 915 is introduced. This allows for the control signals between the MCU with wireless communication 824 and the AP 844 to be exchanged through respective antennae 852 and 851. The switching back and forth between in-band communication of state 911 and the out-of-band communication of state 915 is initiated by the AP 844 of the wireless power RX and charger 842, as described further with respect to FIGS. 10-13.

Figure 10:
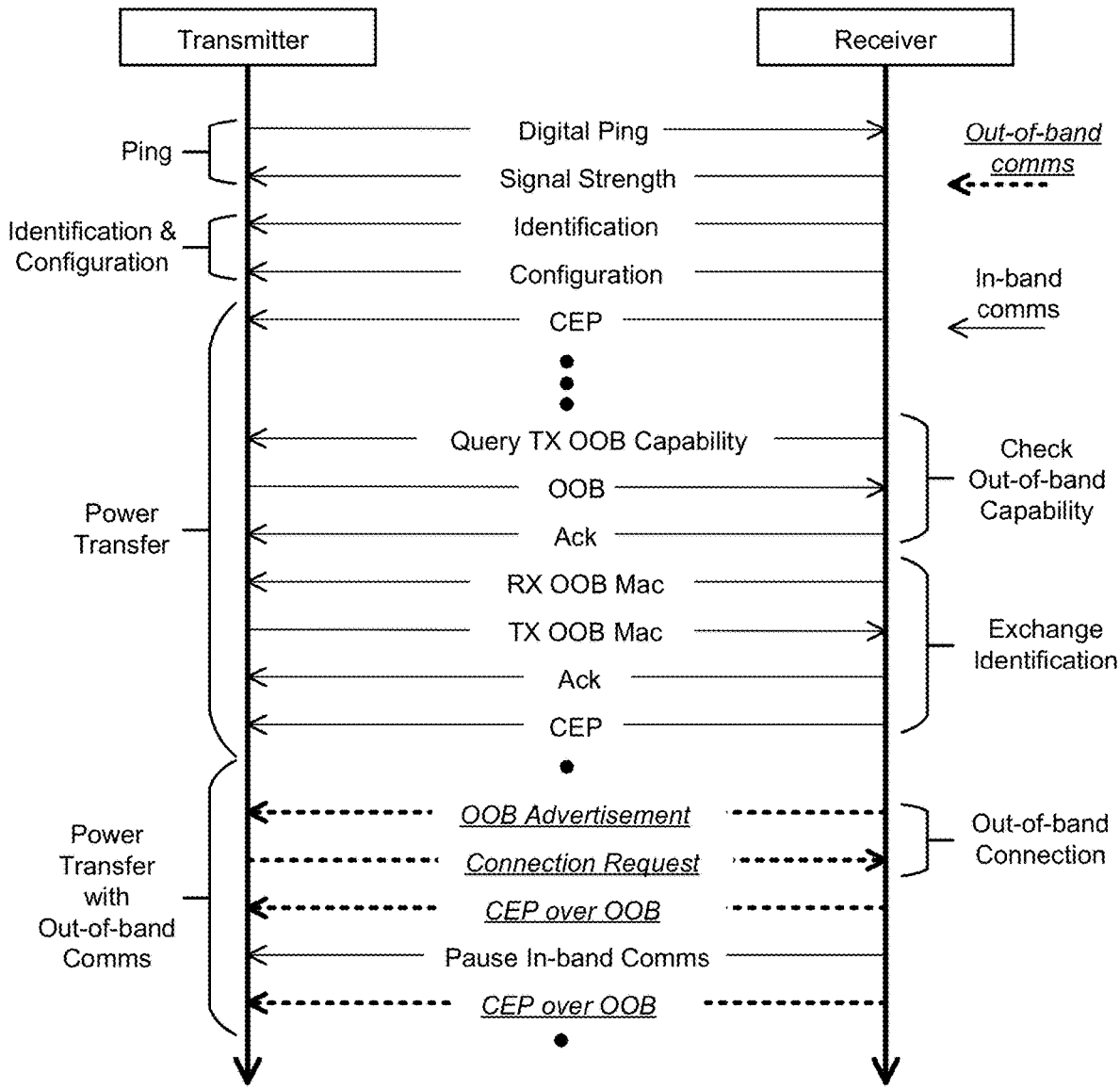
FIGS. 10 and 11 illustrate embodiments of a work flow and sequence for respectively transitioning from the in-band communication channel to the out-of-band communication channel and from the out-of-band communication channel back to the in-band communication channel.
Figure 11:
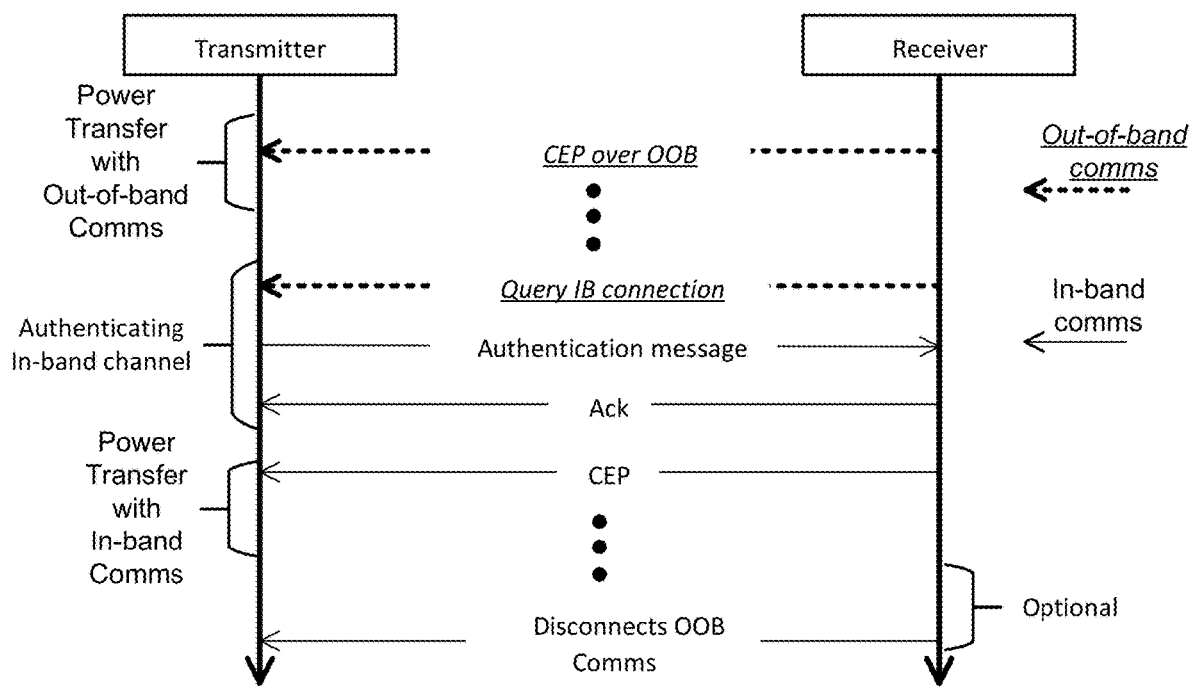

FIGS. 10 and 11 illustrate embodiments of a work flow and sequence for respectively transitioning from the in-band communication channel to the out-of-band communication channel and from the out-of-band communication channel back to the in-band communication channel. In both of FIGS. 10 and 11, the operation of the wireless power TX 822 is shown at the left under Transmitter and the operation of the wireless power RX and charger 842 is shown at the right under Receiver. The signals exchanged are shown down the center, with the out-of-band (OOB) communications shown by arrows of a heavier weight and broken line relative to the in-band signals, and where the OOB communications are in italics and underlined.

The work flow and sequence of FIG. 10 begins with the ping, corresponding to state 903 of FIG. 9, with the wireless power TX 822 sending a digital ping to the wireless power RX and charger 842. This and the next several events are all done by way of the in-band communication channel as, in addition to allowing the process to more easily incorporated into the existing Qi-standard or other protocols, it allows for communication exchange in the case that battery 152 is dead. Following the ping is the Identification and configuration phase (state 905 of FIG. 9) where the wireless power RX and charger 842 communicates this information to the wireless power TX 822. The work flow continues on through the negotiation and calibration phases (states 907, 909 of FIG. 9), including the transmission of a control error packet (CEP) from the wireless power RX and charger 842 to the wireless power TX 822, which provides control information back to the wireless power TX 822. Up to this point, and on into the initial power transfer (state 911 of FIG. 9), the communications have been through the in-band communication channel.

The work flow of FIG. 10 next establishes the out-of-band communication channel using the in-band communication channel as part of the transition from state 911 to state 915 of FIG. 9. Picking up the work flow after the ellipsis and starting from the power transfer phase where standard charging through in-band communication capability has been established, the wireless power RX and charger 842 queries the availability of out-of-band communication of the wireless power TX 822 as a start to establishing the out-of-band capacity of the wireless battery charging system 800. The AP 844 of the wireless power RX and charger 842 may determine to make the query based on a determination to use the open-loop DC-DC converter 350, such as described with respect to the FIG. 12 below, for example. In other embodiments, the AP 844 may issue the query at this stage for whichever DC-DC converter is to be used, for instance even if the wireless power RX and charger 842 only includes a closed-loop DC-DC converter such as 348. TX 822 responds by indicating whether it has out-of-band (OOB) capability, which is acknowledged (Ack) by the wireless power RX and charger 842. If the TX 822 has out-of-band capability, after the acknowledgement the wireless power TX 822 and the wireless power RX and charger 842 exchange identification information for the out-of-band channel.

Following the acknowledgement, the wireless power RX and charger 842 sends the wireless power TX 822 a unique identifier for out-of-band communication, such as the wireless power RX and charger 842's Media Access Control (MAC) address, for the OOB radio signals. In response, the wireless power TX 822 sends the wireless power RX and charger 842 its OOB radio's MAC address through in-band communication. The wireless power RX and charger 842 sends back an acknowledgement (Ack) and a control error packet (CEP).

When the wireless power RX and charger 842 requests to go to the out-of-band communication channel (usually by the AP 844, e.g. for fast charging with the open-loop DC-DC converter 350), the wireless power RX and charger 842 initiates an OOB advertisement through its out-of-band communication channel radio. The wireless power TX 822 receives the wireless power RX and charger 842 OOB advertisement and verifies the MAC address of the wireless power RX and charger 842 and sends a connection request to the wireless power RX and charger 842. After the outof-band connection is established, the communication between the wireless power TX 822 and the wireless power RX and charger 842 moves to the out-of-band channel, with control information, such as CEP packets, being transferred out-of-band. In-band communications are paused (here communicated by in-band signals) or checked in on occasionally at relatively long communication intervals.

FIG. 11 looks at the transition back to in-band communication (state 911 of FIG. 9) when the wireless battery charging system 800 is operating in the power transfer with the out-of-band communication channel (state 915 of FIG. 9). The transition back to in-band communication starts by wireless power RX and charger 842 sending a command (Query IB connection) to the wireless power TX 822 through the out-of-band channel requesting the wireless power TX 822 to authenticate the in-band communication channel. The wireless power TX 822 sends an authentication sequence through the in-band communication channel to the wireless power RX and charger 842, such as the MAC address of the wireless power RX and charger 842 to which it is connected. The wireless power RX and charger 842 authenticates the message and send back an acknowledgement (Ack). Then a CEP received power packet and other packets are communicated through the in-band communication channel. The wireless power RX and charger 842 may disconnect the out-of-band communication channel upon successful establishment of the in-band communication channel.

Figure 12:
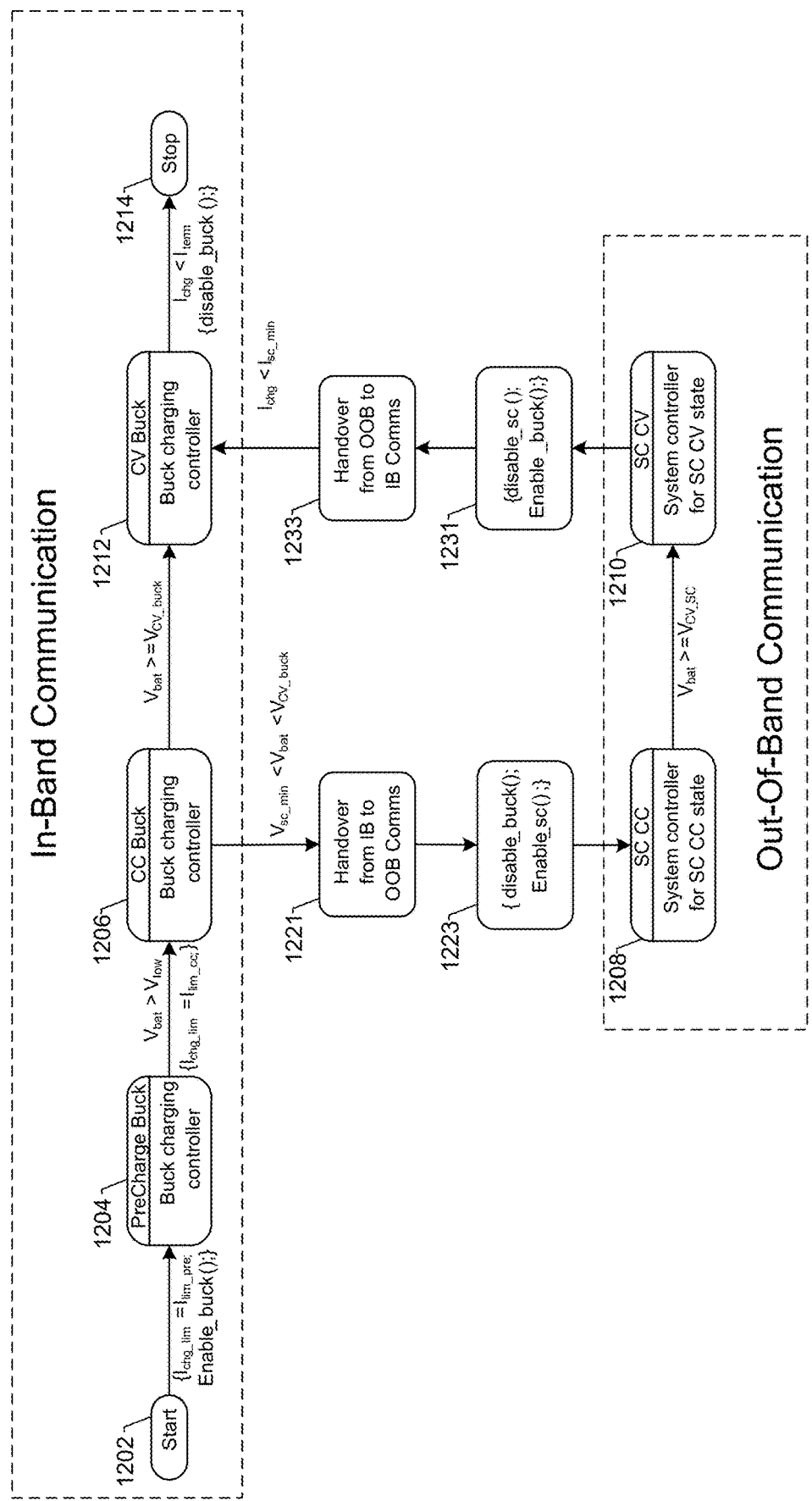
FIG. 12 is a state diagram that is used to explain how the wireless battery charging system shown in FIG. 8 operates in accordance with certain embodiments of the present technology.

FIG. 12 is a state diagram that is used to explain how the wireless battery charging system shown in FIG. 8 operates in accordance with certain embodiments of the present technology. Referring to FIG. 12, following start 1202 a battery charging current limit (Ichg_lim) is set equal to a pre-charge current limit (Ilim_pre), and the buck converter (348 in FIG. 8) is enabled. State 1204 corresponds to the pre-charge phase, during which the closed-loop charger 348 (e.g., buck charger) performs pre-charging and the battery charging current limit (Ichg_lim) is set equal to a constant current limit (Ilim_cc). The pre-charging using the buck charger continues until the battery charging voltage (Vbat) exceeds a first voltage threshold (Vlow), which can also be referred to as a pre-charge voltage threshold. State 1206 corresponds to the constant current buck phase, during which the battery charging current (Ichg) is kept constant, and the battery charging voltage (Vbat) is gradually increased.

When the battery charging voltage (Vbat) exceeds a second voltage threshold (Vsc_min), but is below a third voltage threshold (Vcv_buck), then the buck charger is disabled, the open-loop charger 350 (e.g., switched capacitor charger) is enabled, and state 1208 occurs. For the case of wireless charging with an open-loop charger 350 (such as a switched capacitor charger), based on the state transition among the two chargers, when a change to the open-loop charger 350 is requested, the communication transitions from in-band to out-of-band is performed prior to the charger switch. This is done at states 1221 and 1223. At state 1221, the hand over from in-band to out-of-band communications occurs, as described in more detail with respect to FIG. 10. At state 1223, the closed-loop charger 348 (e.g., buck charger) is disabled and the open-loop charger 350 (e.g., switched capacitor charger) is enabled, as represented by the shown pseudo-code. This transition between in-band and out-of-band communication channels effectively mitigates the potential negative impact of load transitions to communication in the case of using the open-loop chargers.

State 1208 corresponds to the switched capacitor constant current phase, during which the switched capacitor charger is used to charge the battery 152 while maintaining the battery charging current (Ichg) generally constant until the battery charging voltage (Vbat) reaches a further voltage threshold (Vcv_sc), at which point there is a transition to state 1210. State 1210 corresponds to the constant voltage switch capacitor state, during which the switched capacitor charger is used to charge the battery while maintaining the battery charging voltage (Vbat) generally constant until the battery charging current (Ichg) falls below a first current threshold (Isc_min), at which point the switched capacitor charger is disabled, the buck charger is enabled, and there is a transition to state 1212. As with the in-band to out-of-band transition of states 1221 and 1223, whenever a transition to the closed-loop charger 348 (e.g., buck charger) is requested, the transition to the in-band communication channel at state 1233 is done right after the closed-loop charger 348 is enabled and the open-loop charger 350 is disabled at state 1231. In some embodiments, rather than switch back to the in-band communication channel, the wireless battery charging system 800 can continue using the out-of-band communication channel for control signals when going to the closed-loop charger 348, in which case state 1233 is eliminated and subsequent states 1212 and 1214 would now be in the out-of-band communication states, rather than through in-band communication as shown in the embodiment of FIG. 12.

As shown in FIG. 12, it is also possible that there can be a jump to state 1212 directly from state 1206, if the battery charging voltage (Vbat) exceeds the third voltage threshold (Vcv_buck). This may happen, e.g., if a battery starting to be charged is already close to being fully charged from the start.

State 1212 corresponds to the constant voltage buck phase, during which the buck charger is used to charge the battery while maintaining the battery charging voltage (Vbat) generally constant until the battery charging current (Ichg) falls below a second current threshold (Iterm), at which point the buck charger is disabled, and the charging stops at state 1214, because the battery is fully charged.

In the above description Ilim is a current limit setting for pre-charge, an example value is 120 mA. Ilim_cc is current limit setting for CC buck charging, an example value is 1 A-2 A. Iterm is the termination current setting, an example value is 10 mA. Vcv_sc is the minimum voltage to enter CV SC, an example value is 4.1V. Vcv_buck is the minimum voltage to enter CV buck, an example value is 4.2V.

The AP 844 is used to control the system 800 when the open-loop DC-DC converter 350 is used to charge the battery 152, in some embodiments. When the open-loop DC-DC converter 350 operates, the AP 844 controls the overall wireless battery charging system to operate in a closed-loop mode. In some embodiments, the AP 844 regulates Ichg (for the CC SC state) or charging voltage (for the CV SC state). In a constant current charging state, the AP 844 regulates the charging current to follow a target value. In a constant voltage charging state, the AP 844 regulates the battery charging voltage to follow a target value.

In one embodiment, the AP 844 regulates the voltage (Vin) at the input of the wireless power TXIC 226 and the voltage (Vbus) at the output of the wireless power RXIC 246 to realize one or more objectives. One objective is to regulate the charging current (for the CC SC state) or charging voltage (for the CV SC state). The other objective is to control the gain between output of the RXIC 246 and the input of the TXIC 226 (Vbus/Vin) to be close to a specific value that supports the variation in coupling and loading conditions. One other objective could be to control the operating frequency of the wireless charging system to be at or close to a specific value that supports the variation in coupling and loading conditions. The control of Vbus can be done via communications within the charger 342, such as by the AP 344 sending a command to the RXIC 246 to change its output reference. The control of Vin (at the input of the wireless power TXIC 226) may be done by the AP 844 sending a command to the RXIC 246 to communicate information to the TXIC 226 using the receiver coil L2 when operating in the in-band communication channel and using the antennae 851 and 852 when operating in the out-of-band communication channel.

Figure 13:
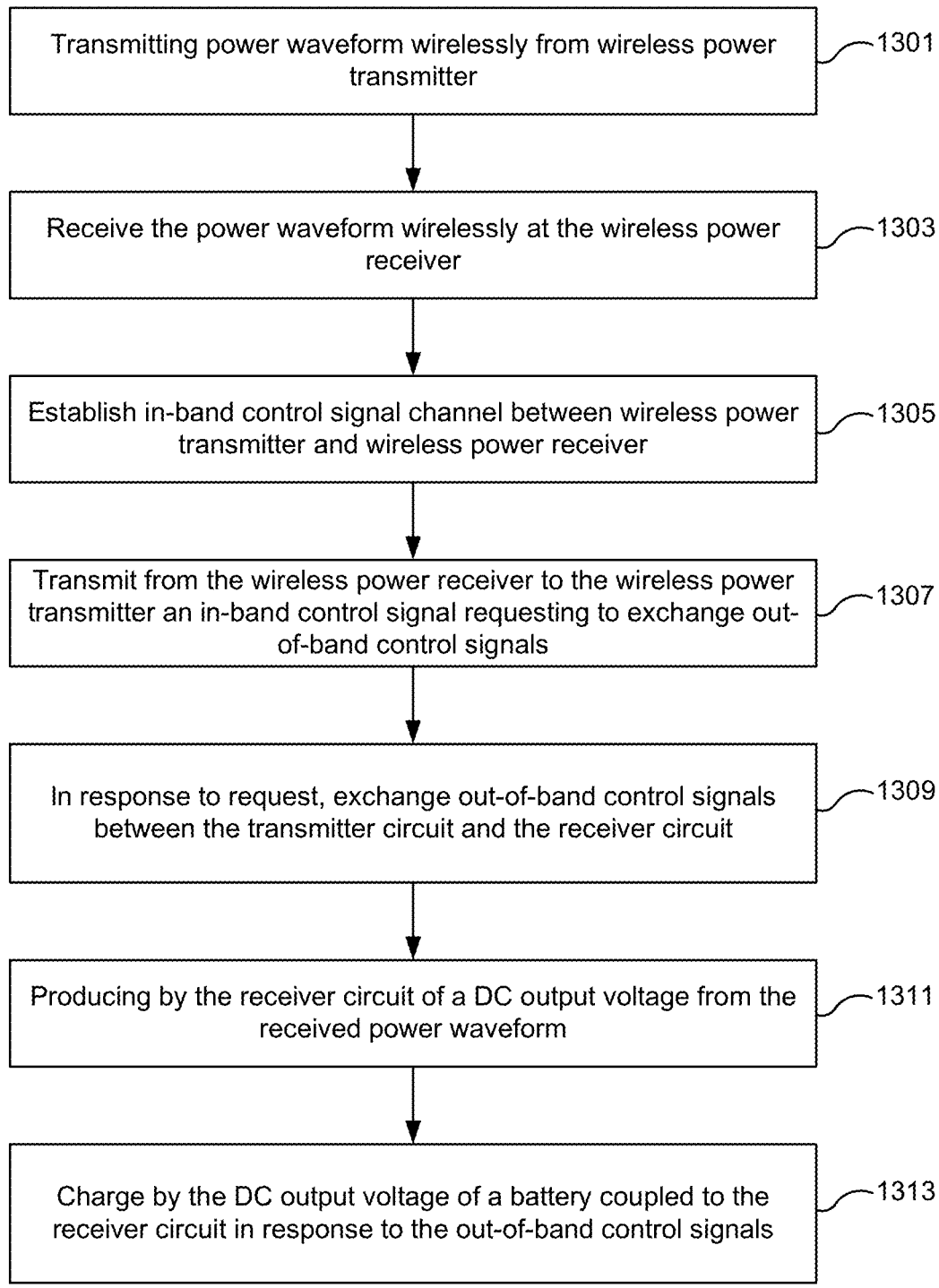
FIG. 13 is a flowchart of one embodiment of a process of operating a wireless power RX and charger using an out-of-band communication channel.

FIG. 13 is a flowchart of one embodiment of a process of operating a wireless battery charging system, such as system 800 of FIG. 8 (whose elements are referenced parenthetically in the following), with an out-of-band communication channel. Step 1301 includes using a transmitter coil (L1) to transmit a power waveform wirelessly from a wireless power transmitter (wireless power TX 226) of a transmitter circuit (wireless power TX 822) to a receiver coil (L2) of wireless power receiver (wireless power RXIC 246) of a receiver circuit (wireless power RX and charger 842).

In step 1303, the power waveform is received wirelessly at the receiver coil (L2) of wireless power receiver (wireless power RXIC 246) of a receiver circuit (wireless power RX and charger 842) from the wireless power transmitter (wireless power TX 226) of the transmitter circuit (wireless power TX 822). At step 1305, an in-band communication channel between the wireless power transmitter (wireless power RXIC 246) and the wireless power receiver (wireless power RX and charger 842) is established, such as described above with respect to FIG. 10. For example, in the embodiment of FIG. 8, this allows control signals to be exchanged between coil L1 wireless power TX 822 and coil L2 of wireless power RX and charger 842, where the control signals can be extracted by MCU with wireless communication 824 on the transmitter side and AP 844 on the receive side.

As also described above respect to FIG. 10, after establishing the in-band communication channel at step 1305, at step 1307 the in-band communication channel is used by the wireless power receiver (wireless power RXIC 246) to transmit a request to the wireless power transmitter (wireless power TXIC 226) to exchange out-of-band control signals between the transmitter circuit (wireless power TX 822) and the receiver circuit (wireless power RX and charger 842). In response to the request, at step 1309 out-of-band control signals are then exchanged between an antenna of the transmitter circuit (852) and an antenna of the receiver circuit (851).

At step 1311, the receiver circuit (wireless power RX and charger 842) produces a DC current output voltage from the received power waveform. Referring to the example of FIG. 8, wireless power RXIC 246 receives the power waveform from coil L2 and provides Vbus to the open-loop DC-DC converter 350 and the closed-loop DC-DC converter 348, one of which then produces the output voltage Vbat that can be supplied to the battery 152. As described above, the out-of-band communication channel is used with the open-loop DC-DC converter to avoid the problems described with respect to FIGS. 6A-6C, 7A and 7B, but in some embodiments the out-of-band communication channel can also be used with the closed-loop DC-DC converter 348. At step 1313, the DC output voltage (Vbat) is used to charge a battery (152) coupled to the receiver circuit in response to the out-of-band control signals.

Certain embodiments of the present technology described herein can be implemented using hardware, software, or a combination of both hardware and software. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does not include propagated, modulated, or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus for charging a battery using wirelessly received power, comprising:
   a wireless power receiver circuit, the wireless power receiver circuit configured receive power wirelessly from a wireless power transmitter, wherein the wireless power receiver circuit generates a direct current (DC) output voltage;
   at least one charging circuits, each of the at least charging circuits comprise a voltage input terminal and a charging output terminal, the voltage input terminal of the at least one charging circuits is coupled to the wireless power receiver circuit, and the charging output terminal of each of the at least one charging circuits is coupled to a terminal of a battery; and
   a controller configured to communicate with the wireless power transmitter by in-band control signals exchanged through the receiver coil of the wireless power receiver circuit and by the out-of-band control signals exchanged through an antenna, the controller further configured to control the charging by the first charging circuit of a battery coupled to the first charging circuit according to the out-of-band control signals, wherein the controller is further configured to perform a charging operation for the battery coupled to the first charging circuit by initially communicating by in-band control signals and subsequently communicating by out-of-band control signals.

2. The apparatus of claim 1, wherein the one or more charging circuits include a closed-loop DC-DC converter and an open-loop DC-DC converter, the first charging circuit being the open-loop DC-DC converter.

3. The apparatus of claim 2, wherein the open-loop DC-DC converter is a switched capacitor charger.

4. The apparatus of claim 2, wherein the closed-loop DC-DC converter is a buck charger.

5. The apparatus of claim 2, wherein the controller is further configured to control the charging by the closed-loop DC-DC converter of a battery coupled to the closed-loop DC-DC converter according to the in-band control signals.

6. The apparatus of claim 2, wherein the controller is further configured to control the charging by the closed-loop DC-DC converter of a battery coupled to the closed-loop DC-DC converter according to the out-of-band control signals.

7. The apparatus of claim 1, wherein subsequent to controlling the charging of the battery coupled to the first charging circuit according to the out-of-band control signals, the controller is further configured to control the charging of the battery by one of the one or more charging circuits according to in-band control signals.

8. The apparatus of claim 7, wherein the one or more charging circuits comprise a plurality of charging circuits, wherein charging of the battery by one of the charging circuits according to in-band control signals includes charging the battery by a second charging circuit coupled to the battery.

9. An apparatus for transmitting power for a wireless charging system, comprising:
   a wireless power transmitter including a transmitter coil, the wireless power transmitter configured to receive an input direct current (DC) voltage and in dependence thereon to use the transmitter coil to transmit power wirelessly to a wireless power receiver of a receiver circuit for the wireless charging system; and
   a controller configured to communicate with the receiver circuit by in-band control signals exchanged through the transmitter coil of the wireless power transmitter and by the out-of-band control signals exchanged through an antenna, the controller further configured to control the charging of a battery by a first charging circuit of the receiver circuit according to the out-of-band control signals, wherein the controller is further configured to control the charging of the battery by the first charging circuit by initially communicating by in-band control signals and subsequently communicated by out-of-band control signals.

10. The apparatus of claim 9, wherein the receiver circuit includes a second charging circuit and the controller is further configured to control the charging of a battery by the second charging circuit according to in-band control signals.

11. The apparatus of claim 9, wherein the receiver circuit includes a second charging circuit and the controller is further configured to control the charging of a battery by the second charging circuit according to out-of-band control signals.

12. The apparatus of claim 9, wherein subsequent to controlling the charging of the battery coupled to the first charging circuit according to the out-of-band control signals, the controller is further configured to control the charging of the battery by one of the one or more charging circuits according to in-band control signals.

13. A method for wirelessly charging a battery of an electronic device, comprising:
   transmitting a power waveform wirelessly from a wireless power transmitter of a transmitter circuit to a wireless power receiver of a receiver circuit;
   receiving the power waveform wirelessly at the wireless power receiver of the receiver circuit from the wireless power transmitter of the transmitter circuit;
   establishing an out-of-band communication channel between the wireless power transmitter and the wireless power receiver;
   exchanging out-of-band control signals between an antenna of the transmitter circuit and an antenna of the receiver circuit via the out-of-band communication channel;
   generating, by the receiver circuit, a direct current (DC) output voltage from the received power waveform;
   charging, by the DC output voltage, a battery coupled to the receiver circuit in response to the out-of-band control signals;
   prior to establishing the out-of-band communication channel, establishing an in-band communication channel between the wireless power transmitter and the wireless power receiver;
   subsequent to establishing the in-band communication channel, transmitting from the wireless power receiver to the wireless power transmitter an in-band control signal via the in-band communication channel requesting to exchange out-of-band control signals between the transmitter circuit and the receiver circuit; and
   establishing the out-of-band communication channel in response to the request.

14. The method of claim 13, wherein the in-band communication channel exchanges signals between the wireless power transmitter and the wireless power receiver according to a Qi interface standard.

15. The method of claim 13, further comprising:
   subsequent to charging, by the DC output voltage, of a battery coupled to the receiver circuit in response to the out-of-band control signals, transmitting from the wireless power receiver to the wireless power transmitter an out-of-band control signals requesting to exchange in-band control signals between the transmitter circuit and the receiver circuit; and
   subsequently charging, by the DC output voltage, the battery coupled to the receiver circuit in response to the in-band control signals.

16. The method of claim 15, wherein:
   while charging, by the DC output voltage, the battery coupled to the receiver circuit in response to the out-of-band control signals, the producing by the receiver circuit the DC output voltage includes producing the DC output voltage by an open-loop DC-DC converter; and
   while charging, by the DC output voltage, the battery coupled to the receiver circuit in response to the in-band control signals, producing by the receiver circuit of the DC output voltage includes producing the DC output voltage by a closed-loop DC-DC converter.

17. The method of claim 13, wherein the producing by the receiver circuit of the DC output voltage includes producing the DC output voltage by a closed-loop DC-DC converter.

* * * * *

UNITED STATES PATENT AND TRADEMARK OFFICE
CERTIFICATE OF CORRECTION

PATENT NO. : 11,342,799 B2
APPLICATION NO. : 16/687288
DATED : May 24, 2022
INVENTOR(S) : Yang et al.

It is certified that error appears in the above-identified patent and that said Letters Patent is hereby corrected as shown below:

In the Claims

Column 24, Line 19 Claim 1: After "configured" and before "receive" insert -- to --.

Signed and Sealed this
Nineteenth Day of July, 2022

Katherine Kelly Vidal
*Director of the United States Patent and Trademark Office*